(12) United States Patent
Choi et al.

(10) Patent No.: US 8,513,624 B2
(45) Date of Patent: Aug. 20, 2013

(54) SYSTEMS AND METHODS OF DETECTING FORCE AND STRESS USING TETRAPOD NANOCRYSTAL

(75) Inventors: Charina L. Choi, Berkeley, CA (US); Kristie J. Koski, Livermore, CA (US); Sanjeevi Sivasankar, Ames, IA (US); A. Paul Alivisatos, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 13/357,845

(22) Filed: Jan. 25, 2012

(65) Prior Publication Data
US 2012/0211670 A1 Aug. 23, 2012

Related U.S. Application Data

(63) Continuation of application No. PCT/US2010/043585, filed on Jul. 28, 2010.

(60) Provisional application No. 61/229,209, filed on Jul. 28, 2009.

(51) Int. Cl.
*G01N 21/64* (2006.01)
(52) U.S. Cl.
USPC .................................................. 250/459.1
(58) Field of Classification Search
USPC ........................................... 250/459.1
See application file for complete search history.

(56) References Cited

U.S. PATENT DOCUMENTS 5,516,534 A * 5/1996 Schroeder et al. ............ 424/602
2003/0113709 A1 * 6/2003 Alivisatos et al. ................ 435/4

OTHER PUBLICATIONS

Joshua Schrier et al., "Mechanical and Electronic-Structure Properties of Compressed CdSe Tetrapod Nanocrystals." Journal of Nanoscience and Nanotechnology, vol. 8, No. 4, Apr. 2008, pp. 1994-1998. <doi:10.1166/jnn.2008.039>.*
Dmitri V. Talapin et al., "Seeded Growth of Highly Luminescent CdSe/CdS Nanoheterostructures with Rod and Tetrapod Morphologies." Nano Lett. vol. 7, No. 10, 2007, pp. 2951-2959. <doi:10.1021/nl072003g>.*

* cited by examiner

*Primary Examiner* — Constantine Hannaher
(74) *Attorney, Agent, or Firm* — Lawrence Berkeley National Laboratory

(57) ABSTRACT

Systems and methods of detecting force on the nanoscale including methods for detecting force using a tetrapod nanocrystal by exposing the tetrapod nanocrystal to light, which produces a luminescent response by the tetrapod nanocrystal. The method continues with detecting a difference in the luminescent response by the tetrapod nanocrystal relative to a base luminescent response that indicates a force between a first and second medium or stresses or strains experienced within a material. Such systems and methods find use with biological systems to measure forces in biological events or interactions.

37 Claims, 12 Drawing Sheets

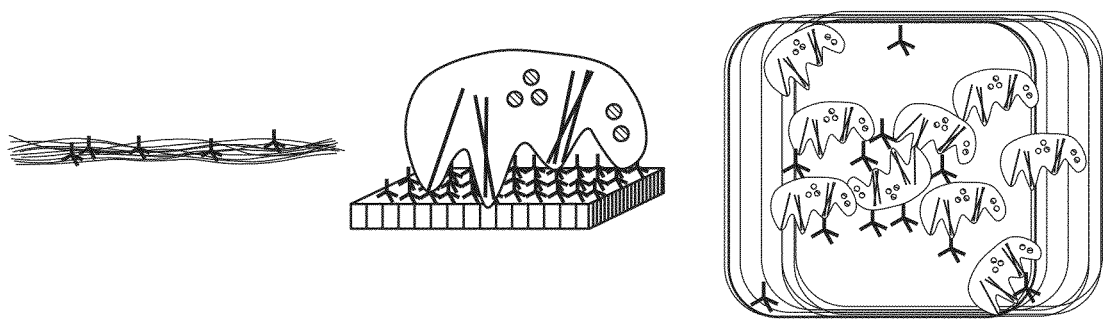
FIG. 9A  FIG. 9B  FIG. 9C
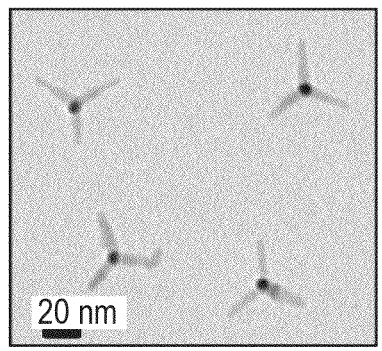
FIG. 10A
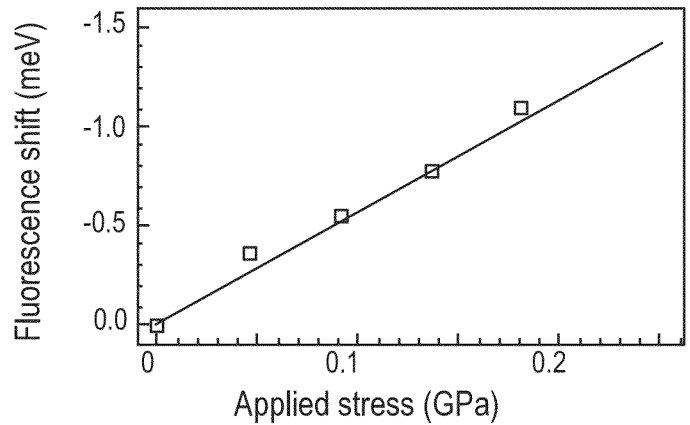
FIG. 10B

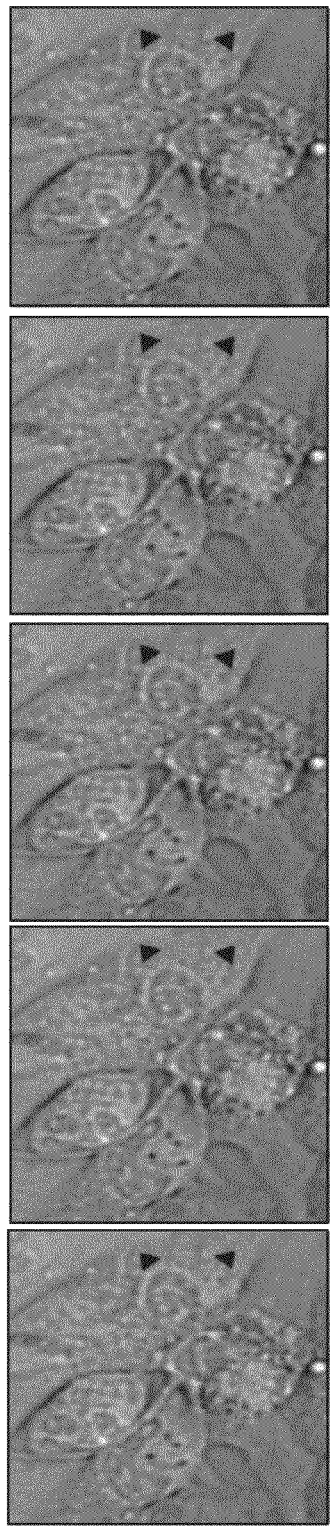
FIG. 11A
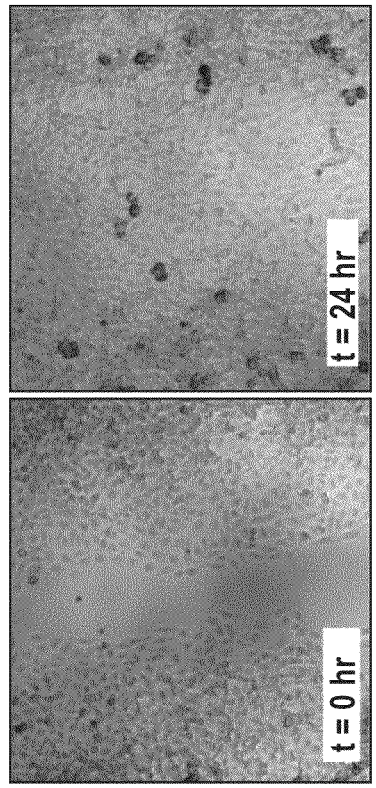
FIG. 11C
FIG. 11B

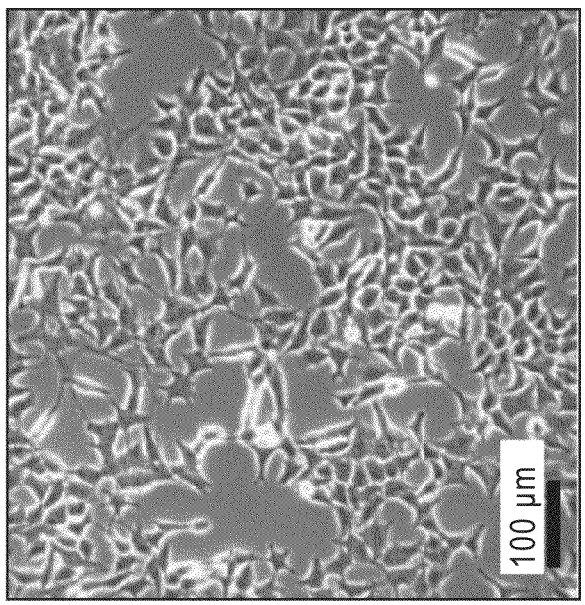
FIG. 12A
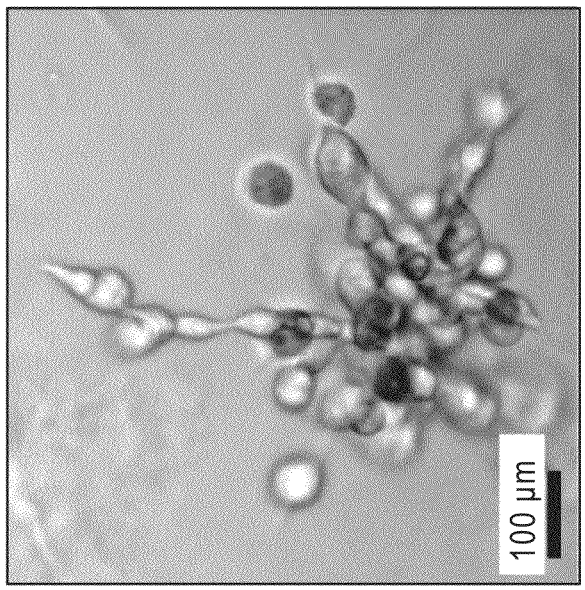
FIG. 12B
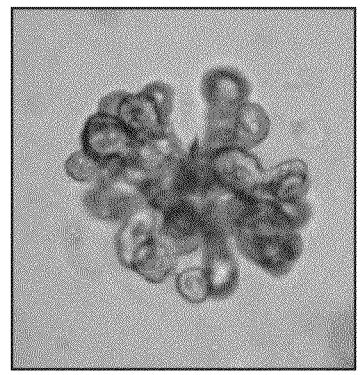
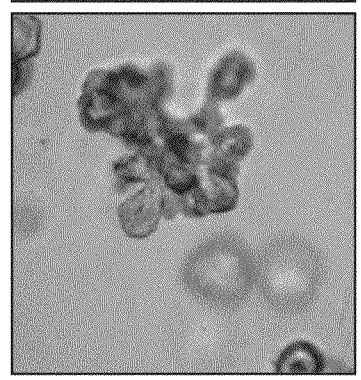
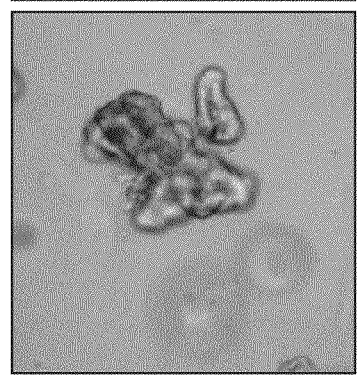
FIG. 12C

SYSTEMS AND METHODS OF DETECTING FORCE AND STRESS USING TETRAPOD NANOCRYSTAL

RELATED APPLICATIONS

This application claims priority as a continuation application to PCT International Application No. PCT/US2010/043585, filed Jul. 28, 2010, which in turn claims priority to U.S. Provisional Application Ser. No. 61/229,209, filed on Jul. 28, 2009, which are herein incorporated by reference in their entireties.

STATEMENT OF GOVERNMENT SUPPORT

This invention was made with government support under Contract No. DE-AC02-05CH11231 awarded by the U.S. Department of Energy and under Grant No. PN2EY016546 awarded by the National Institute of Health. The government has certain rights in this invention.

BACKGROUND OF THE INVENTION

The present invention relates to the field of material science and, more particularly, to the field of nanotechnology.

In recent years, a new generation of quantum confined colloidal semiconductor structures has emerged, with more complex shapes than simple quantum dots (e.g., see Alivisatos, A. P. *Science* 1996, 271, 933-37). These include nanorods (e.g., see Peng, X., et al. *Nature* 2000, 404, (6773), 59-61) and tetrapods (e.g., see Manna, L., et al. *Nat. Mater.* 2003, 2, (6), 382-85). Beyond shape, it is also now possible to spatially vary the electron and hole potentials within these nanoparticles by varying the composition. Examples of these new structures include seeded dots, rods, and tetrapods, which contain a CdSe core embedded within a CdS shell (e.g., see Li, J. J., et al. *J. Am. Chem. Soc.* 2003, 125, (41), 12567-75; Talapin, D. V., et al. *Nano Lett.* 2007, 7, (10), 2951-59; Carbone, L., et al. *Nano Lett.* 2007, 7, (10), 2942-50; and Fiore, A., et al. *J. Am. Chem. Soc.* 2009, 131, 2274-82). These structures may have many uses beyond those envisioned for simple quantum dots, which are frequently employed in luminescent applications (e.g., see Alivisatos, P. *Nat. Biotechnol.* 2004, 22, (1), 47-52).

A tetrapod nanocrystal has a central core with four arms branching out at tetrahedral angles (see Manna et al.). It has been previously shown that tetrapod arms can be bent. For instance, when a CdTe tetrapod (4 nm wide and 100 nm long arms) is deposited on a substrate through solvent evaporation, the fluid exerts a capillary force which pulls the tetrapod towards the substrate, in some cases permanently deforming the arms (see Cui, Y., et al. *Nano Lett.* 2004, 4, (6), 1093-98). Salmeron and coworkers used an atomic force microscope to press on the outward-projecting arms of surface-immobilized CdTe tetrapods, and have shown that for forces below 100 nN, the tetrapod flexes elastically (see Fang, L., et al. *Chem. Phys.* 2007, 127, 184704). Motivated by these observations, Wang and coworkers computationally modeled the electronic level structure of a CdSe tetrapod with different degrees of arm bending, induced by nanonewton forces, and based on their model predicted a red-shift of the energy gap with increasing force applied axially to a vertical arm of a tetrapod with the other three arms either fixed to a horizontal substrate or the arms in sliding contact with the substrate (see Schrier, J.; Lee, B.; Wang, L. W. *J. Nanosci. Nanotechnol.* 2008, 8, (4), 1994-98).

SUMMARY OF THE INVENTION

Embodiments of the present invention include a method of detecting force and a method of detecting stress. According to an embodiment, the method of detecting force includes exposing a tetrapod nanocrystal to light, which produces a luminescent response by the tetrapod nanocrystal. The tetrapod nanocrystal couples a first medium to a second medium. The method continues with detecting a difference in the luminescent response by the tetrapod nanocrystal relative to a base luminescent response that indicates a force between the first and second mediums.

According to an embodiment, the method of detecting stress includes exposing a sample that comprises a medium and a tetrapod nanocrystal embedded in the medium to light. This produces a luminescent response by the tetrapod nanocrystal. The method continues with detecting a difference in the luminescent response by the tetrapod nanocrystal relative to a base luminescent response that indicates a stress within the sample.

In one embodiment, tetrapod nanocrystals are incorporated into biological fibers. In another embodiment, cells are cultured in or on top of and exert forces on a two-dimensional substrate having the tetrapod nanocrystals disposed between the cells and the substrate. In yet another embodiment, the tetrapod nanocrystals are used to investigate cellular forces in a three-dimensional cell culture, which closely mimics the in vivo environment. The tetrapod nanocrystals can provide a quantitative picture of the mechanical behavior of cells and their extracellular matrix (ECM) environment. The development of tetrapod nanocrystals as biomechanical probes with optical readout provides a platform technology for studies of many other biomechanical processes.

BRIEF DESCRIPTION OF THE DRAWINGS

The present invention is described with respect to particular exemplary embodiments thereof and reference is accordingly made to the drawings in which:

FIG. 1d provides percentage of particles emitting in the transition ~1.9 eV under compression in toluene. Less than 50% of dots (circles) and rods (rod-shapes) emit at this transition, while nearly 100% of tetrapods (crosses) do. FIG. 1e provides a difference plot of the fluorescence peak maxima for CdSe/CdS tetrapods compressed in hydrostatic and non-hydrostatic media provides a measure of the net deviatoric stress effect on tetrapod emission. The linear fit shown provides a guide to the eye. Error bars show the standard error of peak position from the fit.

FIG. 5a: The CdSe/CdS tetrapod is a tetrahedrally-symmetric nanocrystal consisting of a zinc-blende CdSe core (dark gray) with four CdS arms (light gray). FIG. 5b: Red fluorescence is observed throughout a single polyester fiber incorporated with CdSe/CdS tetrapods. FIG. 5c: SEM images demonstrate that tetrapods, which appear in the higher magnification image as lighter-contrast branched particles, are fully embedded within a single polyester fiber.

FIG. 6a: Fluorescence spectra of tetrapods embedded in a single polyester fiber under extension. A fluorescence red-shift is clearly observed with increasing strain. A spectral shoulder matches that of the tetrapods in solution (upside-down triangle). FIG. 6b: The change in energy of the tetrapod emission-maximum as a function of extension. Traces of single polyester fibers (dotted lines) reveal varied mechanical behavior, consistent with variations in microstructure domains within and among single fibers. The average (solid line) in the elastic regime is correlated with the known Young's modulus of polyester fiber to calibrate the tetrapod strain gauge. Error bars depict the standard deviation of fiber behavior; fit error is within the data markers. FIG. 6c: Emission-maxima of tetrapods in Nomex® and nylon single fibers as a function of fiber extension (dotted lines) and the corresponding average (solid lines) demonstrate an accurate measure of the Young's modulus of these fibers (black, literature values). The error bars represent the error in calculated modulus due to linear fit.

FIG. 7a: A spatially resolved profile of the stresses along a fiber with increasing tensile strain. Fluorescence of the same section of fiber is monitored throughout; however, this length increases as the fiber is extended and thus fluorescence spectra are collected at a greater number of 400 µm spots. 20 data points are collected at 0% extension up to 26 data points at 22.5% extension. FIG. 7b: Area-normalized histograms of the tetrapod emission-maximum along the fiber at increasing fiber extension using data from the stress profile in a, with 0.1 nm bin size. The stress distribution narrows with fiber extension and then widens, indicating that the stresses initially become more homogeneous upon tensile strain, and become increasingly heterogeneous after plastic onset.

FIG. 8a: CdSe/CdS tetrapods with shorter (thin solid line) and longer (thick solid line) arms both exhibit reduced stress sensitivity in tensile experiments. FIG. 8b: CdSe/CdS quantum dots (bottom line of filled circles) show a blue-shift with increasing tensile strain, similar to their behavior under hydrostatic pressure, while CdSe/CdS quantum rods (thick solid line) show no net shift. Both quantum dots and rods do not exhibit a clear identification of sensitivity to anisotropic stress.

FIGS. 9a-9c illustrate that tetrapod nanocrystals may be used to optically investigate stresses in biological systems of one- (FIG. 9a), two- (FIG. 9b), and three- (FIG. 9c) dimensional geometries. FIG. 9a: Tetrapod nanocrystals are incorporated into biological fibers. FIG. 9b: Cells are cultured on top of and exert forces on a 2D tetrapod nanocrystal substrate. In FIG. 9c: The tetrapod nanocrystals are used to investigate cellular forces in a three-dimensional cell culture.

FIGS. 10a-10f show the structure and properties of CdSe/CdS tetrapod nanocrystals and showcase their applicability as a unique stress-sensing tool. FIG. 10a: Transmission electron microscopy image of tetrapod nanocrystals. Tetrapod nanocrystals consist of four arms branched from a central quantum dot core. The fourth arm in this image is sticking out of the plane of the page, as evidenced by the increased contrast. FIG. 10b: The fluorescence of tetrapod nanocrystals red-shifts as a function of increasing stress. The calibration for CdSe/CdS tetrapod nanocrystals with 25 nm CdS arms, shown here, shows a shift of −5.8±1.2 meV/GPa. FIG. 10c: CdSe/CdS tetrapod nanocrystals exhibit broad absorbance and narrow fluorescence. Due to the type-I core/shell heterostructure, these tetrapods have high quantum yields ranging from 30-60%. FIG. 10d: Tetrapod nanocrystals may be easily water-solubilized and functionalized with phytochelatin-related peptide ligands. We have designed such a peptide (shown as ligand in reaction product) with KGRGDSP, an integrin-binding sequence found in fibronectin, on the N-terminus. Cmd: carboxamide, cha: 3-cyclohexylalanine. The black curve represents the tetrapod nanocrystal surface. FIG. 10e: The fluorescence behavior of single tetrapods can be observed. Here we show a fluorescence intensity profile of a single CdSe/CdS tetrapod nanocrystal, as evidenced by the intensity blinking. The three intensity levels, marked with black lines, correlate with other studies of CdSe/CdS single nanocrystal systems. While ensemble tetrapod experiments are proposed here, single tetrapod experiments will be performed in parallel and may provide a unique platform for highly spatially-resolved stress sensing. FIG. 10f: The CdSe/CdS system is versatile and may be chemically transformed to alternate semiconductor materials for wavelength tunability, such as PbSe/PbS with emission in the infrared for future in vivo experiments. X-ray diffraction spectra are presented for sample of CdSe/CdS core/shell rods, which can be converted to Cu2Se/Cu2S and further to PbSe/PbS with cation exchange.

FIGS. 11a-11c demonstrate tetrapod nanocrystals used in 2D platforms for studying cell growth on tetrapod nanocrystal arrays, as well as commonly used motility assays. FIG. 11a: Brightfield microscopy image sequence of cardiomyocytes cultured on top of a 2D tetrapod nanocrystal array. Cardiomyocytes grow on the tetrapod nanocrystal substrates and exhibit beating at a rate of 1 Hz. The arrows highlight two lines of contrast within the cell which are dark when the cells contract (first, third, and fifth frame) and lighter when the cells relax (second and fourth frames). FIG. 11b: The fluorescence image shown here is an overlay of GFP-labeled mammary breast cells which can grow and flatten on a 2D tetrapod nanocrystal array. FIG. 11c: The scratch assay is an informative 2D assay for cell migration. The brightfield images shown here depict a plate of cells which are scratched (t=0 hr) and subsequently migrate to fill the scratch (t=24 hr).

FIGS. 12a-12c demonstrate tetrapod nanocrystals used in 3D cell culture systems. MDA-MB-231 cells are cultured in 2D plastic (FIG. 12a) or in laminin-rich MATRIGEL (FIG. 12b). The invasive capabilities of this cell line are difficult to appreciate in 2D (FIG. 12a), but easily observed in 3D culture using time-lapse microscopy. In addition, primary mammary epithelial cells from mice cultured in MATRIGEL show dramatic cellular remodeling over days during branching morphogenesis (FIG. 12c). This behavior requires cell-generated forces, which can be studied using tetrapod nanocrystal technology.

DETAILED DESCRIPTION OF THE INVENTION

Figure 1:
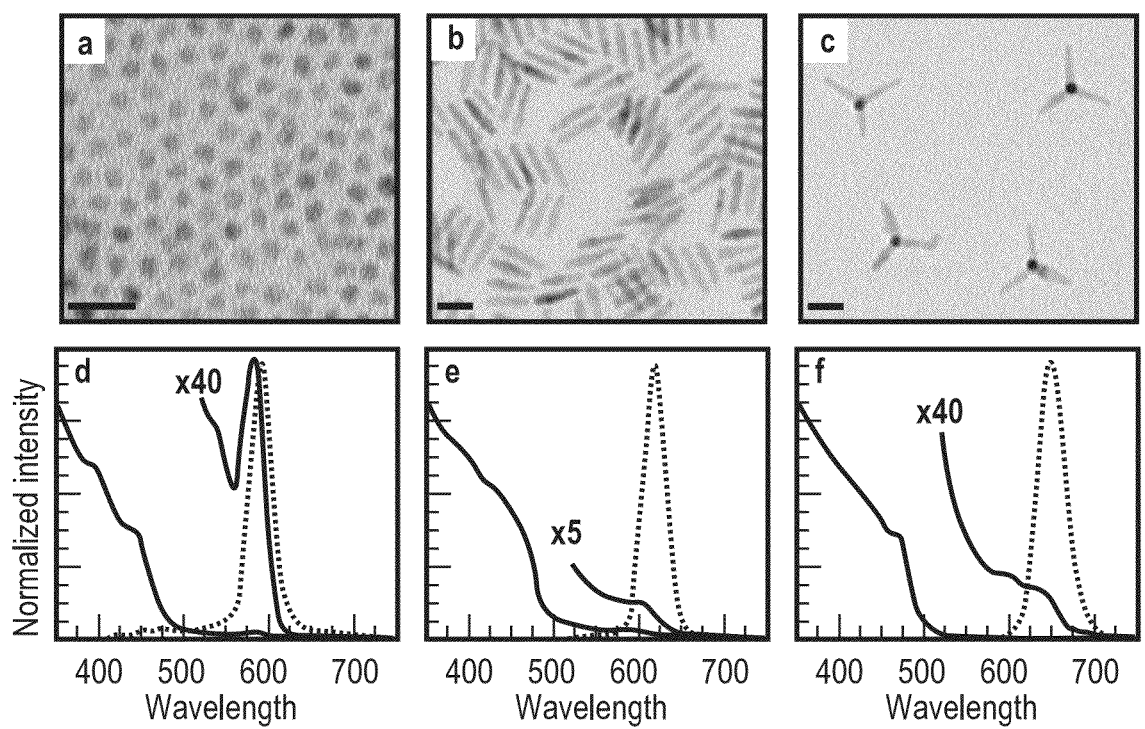
FIGS. 1a-1f provide transmission electron microscopy (TEM) images and optical spectra of CdSe/CdS core/shell nanocrystals with different geometries. The crystal structures of the core and shell are either wurtzite (wz) or zincblende (zb). TEM images for CdSe/CdS core/shell (FIG. 1a) dots (wz-CdSe core/wz-CdS shell), (FIG. 1b) rods (wz-CdSe core/wz-CdS rod shell), and (FIG. 1c) tetrapods (zb-CdSe core/wz-CdS arms). Corresponding ensemble absorption (solid line) and fluorescence (dotted line) spectra for CdSe/CdS (FIG. 1d) dots, (FIG. 1e) rods, and (FIG. 10 tetrapods. The x40 and x5 traces are provided for clear visualization of the exciton absorption peak. All scale bars 20 nm.

Embodiments of the present invention include compositions and systems for and methods of detecting force and stress using a branched, luminescent tetrapod nanocrystal, which are capable of optically reporting changes in force. The tetrapod nanocrystals, also called tetrapod "quantum dots" (tQDs), are fluorescent reporters of hydrostatic and non-hydrostatic forces. In some embodiments, these tetrapod nanocrystals can be incorporated into systems of any geometry, such as one-, two- or three-dimensional cell culture systems, and used to detect complex intracellular events and calculate the forces involved.

The tetrapod nanocrystal may comprise any binary or ternary compounds of any combination of Group I, II, III, IV, V, and/or VI element or metal and any derivatives thereof. In one embodiment, the tetrapod nanocrystal used in the present invention is described in U.S. Pat. No. 7,311,774 issued on Dec. 25, 2007 and/or made as described in U.S. Pat. No. 7,311,774, hereby incorporated by reference in its entirety for all purposes. In one embodiment, the tetrapod nanocrystal comprises a II-VI semiconductor. For example, one or more tetrapod nanocrystals may comprise a CdS or CdSe core and arms.

In one embodiment, suitable compound semiconductors include Group II-VI semiconducting compounds such as MgS, MgSe, MgTe, CaS, CaSe, CaTe, SrS, SrSe, SrTe, BaS, BaSe, BaTe, ZnS, ZnSe, ZnTe, CdS, CdSe, CdTe, HgS, HgSe, and HgTe. Other suitable compound semiconductors include Group III-V semiconductors such as GaAs, GaP, GaAs—P, GaSb, InAs, InP, InSb, AlAs, AlP, and AlSb. The use of Group IV semiconductors such as germanium or silicon may also be feasible under certain conditions. In other embodiments, the particles may comprise a dielectric material such as SiC, SiN or any other material that can exhibit polytypism. Some metals such as Fe, Ni, Cu, Ag, Au, Pd, Pt, Co and others may also exhibit polytypism and can be used in embodiments of the invention. In another embodiment, tetrapod nanocrystals can be made of compounds such as $Cu_2S$, $Cu_2Se$, SnS, PbSe, or PbS.

In a particular embodiment, one or more tetrapod nanocrystals comprise a CdSe core and four tetrahedrally attached CdS arms. (Talapin, D. V., Nelson, J. H., Shevchenko, E. V., Aloni, S., Sadtler, B., and Alivisatos, A. P. 2007. *Nano Lett.* 7:2951-2959). Due to the type-I heterostructure nature of this core/shell system, these tQDs are highly luminescent with quantum yields of 30-60%, making them ideal for optical detection measurements.

Exposure to light produces a luminescent response by the one or more tetrapod nanocrystals. In an embodiment, the luminescent response comprises fluorescence. Any light source can be used that will excite the tetrapod nanocrystals at specific wavelengths. In some embodiments, the light source is an argon ion laser with 488 nm excitation wavelength. Brightfield and fluorescence images may be taken with a digital microscope camera and fluorescence spectra are monitored with a spectrometer and/or an imaging means such as a charged-coupled device (CCD) detector to detect the luminescent response of the tetrapod nanocrystals. Specified exposure times (e.g., of about 0.1 s) are used to collect spectra. Using a means such as a CCD should allow the forces applied over a measurable area to be readily quantifiable by looking at the identifiable response over a specific detector or pixel area.

The detection of a difference in the luminescent response relative to a base luminescent response indicates a stress or strain on or within the sample. In an embodiment, the stress is an anisotropic stress. As used herein, the term "anisotropic stress" means a stress in a first direction that has a value different from another stress in a second direction.

Thus, one embodiment the present invention provides a method of detecting force of the present invention includes exposing one or more tetrapod nanocrystals to light which produces a luminescent response by the one or more tetrapod nanocrystals. In embodiment, one or more tetrapod nanocrystals couple a first medium to a second medium. The method continues with detection of a difference in the luminescent response by the one or more tetrapod nanocrystal relative to a base luminescent response. The difference in the luminescent response indicates a force or forces between the first and second mediums.

In one embodiment, the first and second mediums comprise biological material. In another embodiment, the first medium comprises biological material and the second medium comprises a solid material. According to this example, the difference in the luminescent response may indicate a force exerted by the biological material on the solid material or the reverse. Biological material may include any material of biological or organic origin, including but not limited to, any biological tissue of any biological origin, cells of any type, cellular organelles, nucleic acids, polynucleotides, polypeptides, proteins, polymers, membranes, membrane proteins and components, small molecules, biological fluids such as blood, saliva or semen, or biological waste.

In yet another embodiment, the first medium comprising a solid material and the second medium comprising a flexible material and the difference in the luminescent response indicates the force between the solid material and the flexible material. For example, the flexible material may be a sensor pad of an electronic or consumer device and when contacted (e.g., touched by a person) the flexible material exerts a small force on the order of nanonewtons on the one or more tetrapod nanocrystals, which is detected by the change in the luminescent response. The materials may comprise any metal, polymer, element, glass or other substrate of any shape or geometry. In another embodiment, the material comprising a natural polymer, synthetic polymer or biological polymer, polymer fiber or polymer glass. The embedded tetrapod nanocrystals can detect the stress or strain within the material. So long as the Young's modulus of the medium is less than that of the tetrapod nanocrystal, the embedded tetrapod nanocrystals can detect the stress or strain within the medium. For example, the Young's modulus of the CdS/CdSe tetrapods used in the examples is about 50 GPa and polyester fiber has a known Young's modulus of 8.3 GPa.

In another embodiment, a method of detecting force or stress on the cellular level of biological events and interactions. Thus, in one embodiment, the method includes exposing a sample to light. In one embodiment, the sample comprising a biological material such as cell medium for cell growth, or other culture systems which may comprise extracellular matrix proteins and macromolecules including but not limited to collagen, elastin, laminin, fibronectin, polysaccharides and proteoglycans. One or more tetrapod nanocrystals can be disposed upon or embedded in the medium. See FIG. 9. For example, one or more of such embodiments may be used in studies of cancer metastasis, cell motility, stem cell differentiation, cell interactions, cell migration, or other suitable biological studies. Such studies may be in vitro or in vivo, but for the latter, toxicity issues (e.g., due to the Cd of the tetrapod nanocrystals) may need to be addressed.

Figure 3:
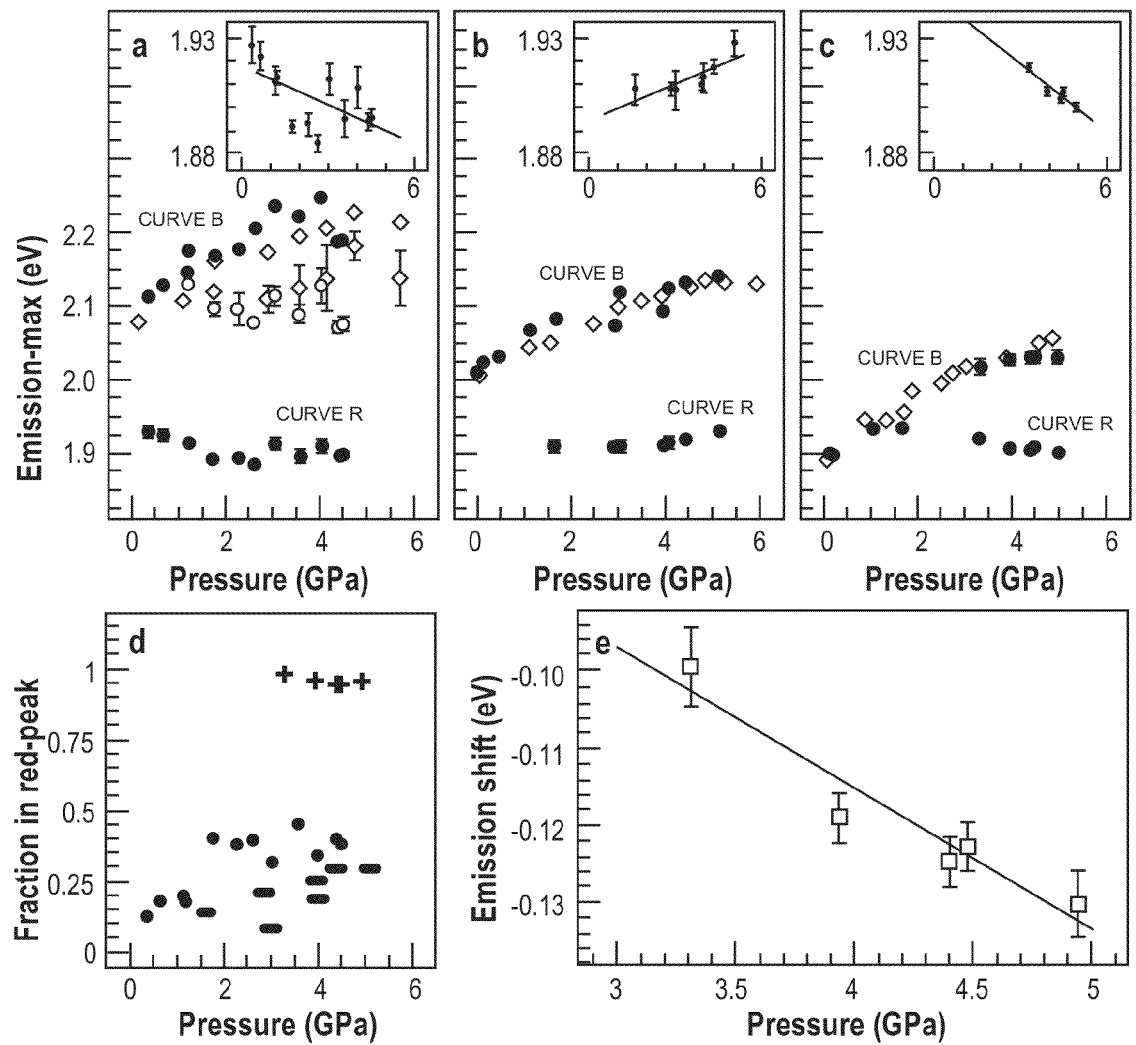
FIGS. 3a-3e provide data of deviatoric stresses inducing new radiative transitions in semiconductor nanocrystals. Fluorescence peak positions in CdSe/CdS (FIG. 1a) dots, (FIG. 1b) rods, (FIG. 1c) tetrapods. Unfilled symbols denote the peak positions in 1:1 pentane:isopentane; filled symbols denote the peak positions in toluene. Under non-hydrostatic pressure, three radiative transitions are observed in dots and two radiative transitions are observed in rods and tetrapods. Insets in FIGS. 1a-1c provide a magnification of the emission points at the transition ~1.9 eV, with x-axis 0-6 GPa and y-axis 1.879-1.937 eV; linear fit provides a guide to the eye.
Figure 5:
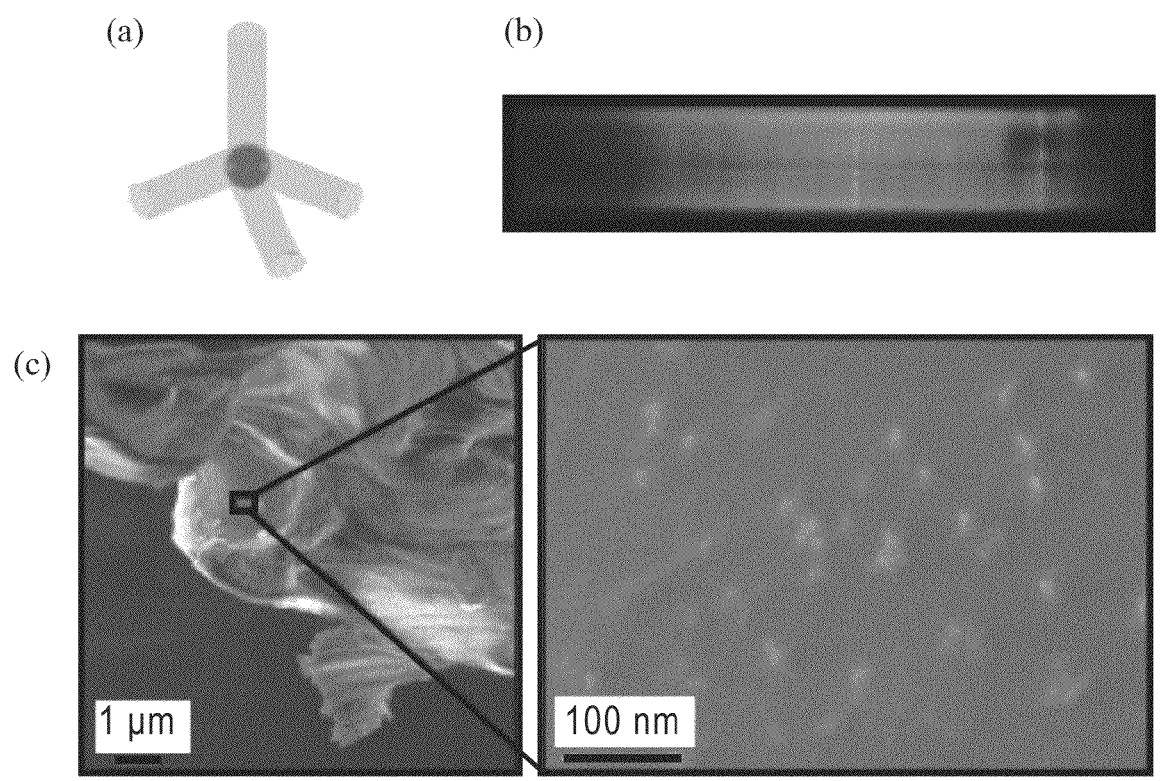
FIGS. 5a-5c show the CdSe/CdS tetrapod incorporated into single polyester fibers.

The tetrapod nanocrystals can be used in any of the three system geometries outlined in FIG. 5 and present a modular approach to using tQDs as biomechanical probes (FIG. 9). In FIG. 9a, tQDs are incorporated into biological fibers, a natural extension of presently described work with tetrapods in synthetic polymer fibers. In FIG. 9b, cells are cultured on top of and exert forces on a 2D tQD substrate, an embellishment of the traditional cell culture geometry. In FIG. 3c, the tQD strain gauge is extended to investigate cellular forces in 3D culture, which most closely mimics the in vivo environment. Each geometry is standalone and the systems shown provide both a means for a qualitative and quantitative understanding of biological forces in the specified system geometry. Together, FIG. 9 serve to provide a broad picture of detection of cellular forces exerted in biologically relevant systems of one, two, and three dimensions by the present tetrapod nanocrystals.

According to one embodiment a system for detecting force in a biological context, wherein the medium comprises cell medium for cellular growth, extracellular matrix proteins or polymers, or other biological materials or tissues. In another embodiment, the system further comprising further comprising biological cells cultured or grown on or in the medium. In one embodiment, the tetrapod nanocrystals are disposed between the medium and the cells as shown in FIG. 9b.

Cell types include any prokaryotic or eukaryotic cell, including bacteria, archea, mammalian, human or other cell type. In some embodiments, the cells used in the presently described system include human epithelial cells, such as human mammary epithelial cells, stem cells, cardiomycetes, neurons, etc.

In an embodiment, one or more tetrapod nanocrystals are located at a cell-cell interface or cell-cell interfaces and the difference in the luminescent response indicates a stress at the cell-cell interface or cell-cell interfaces. In another embodiment, one or more tetrapod nanocrystals are located at a cell-ECM (extracellular matrix) interface or cell-ECM interfaces and the difference in the luminescent response indicates a stress at the cell-ECM interface or interfaces. For example, one or more of such embodiments may be used in studies of cancer metastasis, cell motility, stem cell differentiation, cell interactions, cell migration, or other suitable biological studies. Such studies may be in vitro or in vivo, but for the latter toxicity issues (e.g., due to the Cd of the tetrapod nanocrystals) may need to be addressed.

Figure 10C:
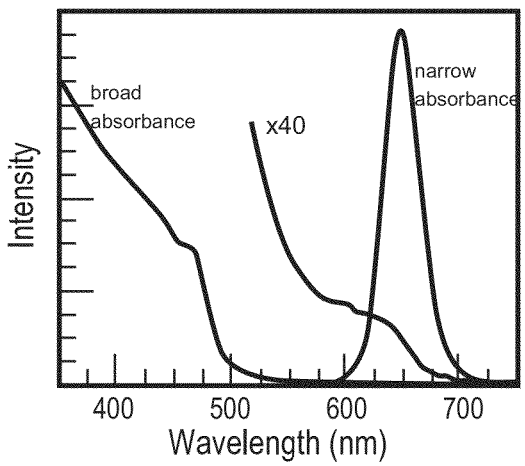
Figure 10E:
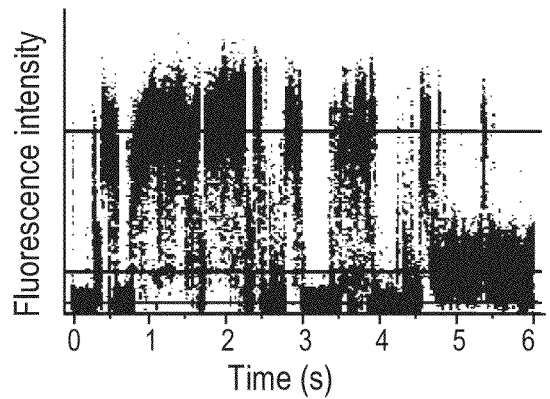
Figure 10D:
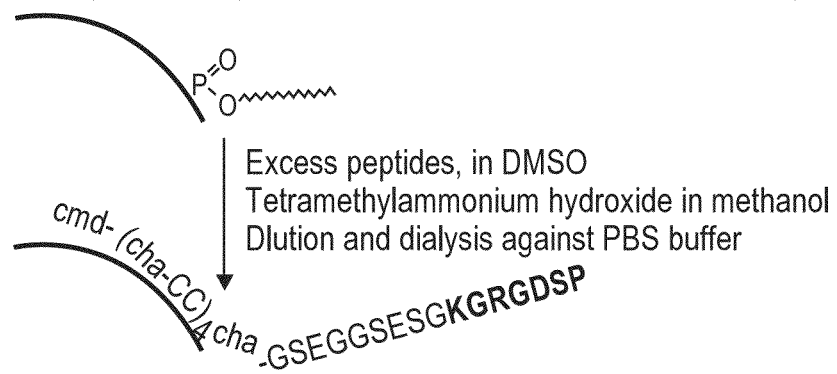
Figure 10F:
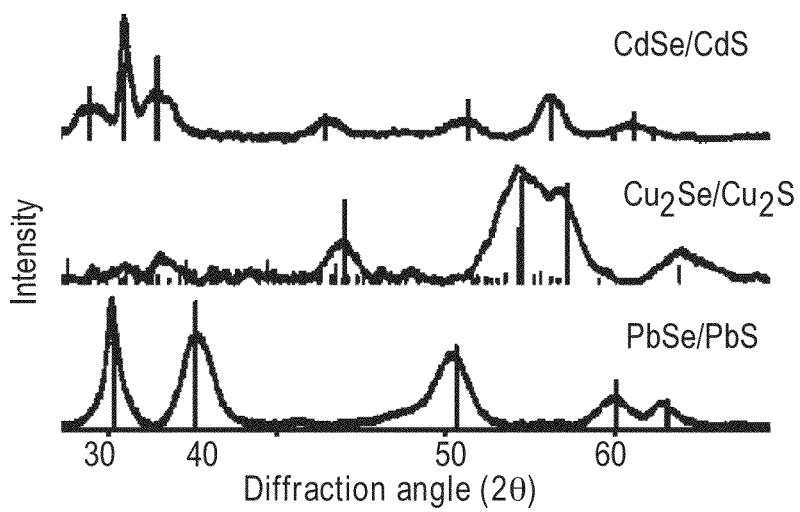

In another embodiment, the tetrapod nanocrystals are biofunctionalized, thereby further enabling the tQDs to detect specific cellular events or forces. For example, to sense cellular forces, the tQDs can be specifically located to integrin sites, where mechanical communication occurs between the cell and the ECM. This localization requires biofunctionalization of the tQDs, since they are typically synthesized and solubilized in organic solvents, and stabilized with long alkyl-chain phosphonic acid ligands (Manna, L., Milliron, D. J., Meisel, A., Scher, E. C., and Alivisatos, A. P. 2003. *Nat. Mater.* 2:382-385). There are many approaches to making water-soluble nanocrystals including encapsulation in phospholipid micelles described by Dubertret, B., Skourides, P., Norris, D. J., Noireaux, V., Brivanlou, A. H., and Libchaber, A. 2002. *Science* 298:1759-1762), amphiphilic polymer wrapping as described by Pellegrino, T., et al. 2004. *Nano Lett.* 4:703-707, and ligand exchange as described by Owen, J. S., Park, J., Trudeau, P.-E., and Alivisatos, A. P. 2008. *J. Am. Chem. Soc.* 130:12279-12281; Liu, W., Greytak, A. B., Lee, J., Wong, C. R., Park, J., Marshall, L. F., Jiang, W., Curtin, P. N., Ting, A. Y., Nocera, D. G., et al. 2010. *J. Am. Chem. Soc.* 132:472-483, all of which are hereby incorporated by reference for all purposes. In particular, a nanocrystal ligand exchange to functionalization with phytochelatin-related peptides results in nanocrystals highly stable in aqueous solutions over months (Pinaud, F., King, D., Moore, H.-P., and Weiss, S. 2004. *J. Am. Chem. Soc.* 126:6115-6123). These peptides can be easily functionalized with an additional peptide sequence of interest. One having skill in the art would be able to choose a different sequence for different functional properties provided. For example, to localize tQDs to integrin sites, a phytochelatin-related peptide with the KGRGDSP sequence, a motif from fibronectin, is covalently attached at the N-terminal end (FIG. 10d). Other localization or recognition peptides can be used as well such as the RGD peptide as used in the Examples.

The toxicity of Cd is likely not an issue for certain in vitro cellular systems. However, for future in vivo work, the CdSe/CdS tQD is amenable to growing a ZnS shell on the surface to enable a non-toxic interface (Dabbousi, B. O., Rodriguez-Viejo, J., Mikulec, F. V., Heine, J. R., Mattoussi, H., Ober, R., Jensen, K. F., and Bawendi, M. G. 1997. *J. Phys. Chem. B.* 101:9463-9475). Additionally, a cation exchange mechanism (Son, D. H., Hughes, S. M., Yin, Y., and Alivisatos, A. P. 2004. *Science* 306:1009-1012) can be used to obtain core/shell tQDs composed of less toxic materials.

Other methods of selectively functionalizing tetrapod arms are known and may be adapted for use in the present invention such as the compositions and methods described in WO2006137940 hereby incorporated by reference in its entirety for all purposes.

Tetrapod nanocrystals may also be designed with a wide range of emission wavelengths and force-sensitivities. The size- and composition-controlled emission tunability of semiconductor quantum dots is well-studied (see Bruchez Jr, M. P., Moronne, M., Gin, P., Weiss, S., and Alivisatos, A. P. 1998. Semiconductor nanocrystals as fluorescent biological labels. *Science* 281:2013-2016) and such an approach may also be applied to tQDs. For example, because nearly all the photoluminescence recombination in CdSe/CdS tQDs occurs within the CdSe core, size tunability can be achieved by altering the size of the core. Core/shell tQDs of any other two-material system have not yet been demonstrated, but composition tunability may also be achieved by a cation exchange mechanism. These parallel studies may enable tQDs beneficial for related future experiments, such as PbSe/PbS tQDs emitting in the infrared spectrum for in vivo experiments and long-armed piconewton-sensitive tQDs for mechanical studies of force-generating proteins. It was found that the tetrapod nanocrystals that find use in the present invention have an optimal spect ratio of about 6:1 of length:diameter. The total size of the tQD may depend on the application or use, however, if the aspect ratio is maintained, this should maintain the capabilities of the nanoparticle to be used as a strain or stress gauge.

In addition to biological applications, the method of detecting stress may find application in stress measurement studies, or in consumer or electronic products. For example with regards to stress measurement studies, the method may be used for measuring isotropic or anisotropic stress within a diamond anvil cell, within a nanostructure, or within some other suitable structure. With regards to consumer or electronic products, for example, the method may find application as a touch or contact indicator. For instance, a sensor pad may include one or more tetrapod nanocrystals and when a person touches the sensor pad the method of the present invention may be used to detect the touch.

In one embodiment, the tQDs are made of semiconductor materials, such as a zinc-blende quantum dot (QD) core with four epitaxially attached wurtzite arms protruding from the (111) faces of the core at a tetrahedral angle (as described by Manna, L., Milliron, D. J., Meisel, A., Scher, E. C., and Alivisatos, A. P. 2003. *Nat. Mater.* 2:382-385, hereby incorporated by reference) (FIG. 10a). The QD core is typically about 2-5 nm in diameter, and the arms about 15-60 nm in length. Atomic force microscopy experiments revealed that the tQD arms would bend in response to nanonewton (nN) forces until particle fracture above 100 nN (Fang, L., Park, J. Y., Cui, Y., Alivisatos, P., Shcrier, J., Lee, B., Wang, L. W., and Salmeron, M. 2007. *J Chem Phys* 127:184704). Furthermore, theoretical simulations demonstrated that nN-induced tQD arm bending and the resultant strain would affect the localization of charge carrier wavefunctions inside the nanocrystal, altering the electronic band structure. Specifically, the simulations predicted a red-shift of the nanocrystal fluorescence in response to external anisotropic stress (Schrier, J., Lee, B., and Wang, L. W. 2008. *J. Nanosci. Nanotechnol.* 8:1994-1998). This fluorescence red-shift was experimentally observed in diamond anvil cell pressure experiments on CdSe/CdS core/shell tQDs (Choi, C. L., Koski, K. J., Sivasankar, S., and Alivisatos, A. P. 2009. *Nano Lett.* 9:3544-3549.), and calibrated the effect as a function of applied stress (See Examples below). The tQD fluorescence shifts by −5.8±1.2 meV/GPa in response to anisotropic stress (FIG. 10b), corresponding to about a 2 nm red-shift per GPa. Any system with a spectrometer-equipped CCD detector should detect these shifts. In one embodiment, the spectrometer-equipped CCD detects with at least a spectral resolution of 0.01 nm. Using the presently described system, one can detect stresses down to 5 MPa resolution, corresponding to 0.2 nN resolution in the 2D geometry where stresses are exerted on the top arm of the tQD. In one embodiment, the system further comprises a computer connected to control the light source, detectors and imaging means.

The fluorescence shift of the tetrapod strain gauge is currently calibrated as a function of applied stress. A relationship exists between stress and force such that there exists also a relation between the tetrapod fluorescence shift and the force applied, $$\Delta eV(F) = \Delta eV(P)/A,$$

where $\Delta eV(F)$=change in emission peak energy as a function of force, $P(eV)$=change in emission peak energy as a function of stress, A=area of the tetrapod particle the pressure is applied to. $\Delta eV(F)$ cannot be determined from the polymer fiber calibration experiment because the area on the tetrapod over which the stress is exerted inside the polymer fiber is not known. To determine $\Delta eV(F)$, one can measure the fluorescence shift on single tetrapods due to a known amount of applied force. This experiment can be carried out using a single particle confocal fluorescence microscope combined with an atomic force microscope (AFM). The AFM tip will press with known force on single tetrapods, with simultaneous monitoring of the tetrapod fluorescence spectra. Thus, once the area is known, the fluorescent shift can be calibrated such that the measurement of a spectral shift from the base fluorescent response can be used to calculate the amount of force applied.

Embodiments of the systems and methods of detecting force and stress both include detecting a difference in the luminescent response by the one or more tetrapod nanocrystals relative to a base luminescent response, which is the luminescent response of the tetrapod nanocrystal with no force or stress applied to the nanocrystal. The luminescent response by the one or more tetrapod nanocrystals comprises a photoluminescent spectrum. According to an embodiment, the difference in the luminescent response comprises a shift of a maximum intensity wavelength of the photoluminescent spectrum. For example, the maximum intensity wavelength may increase upon application of a compressive force or stress to a tetrapod nanocrystal. A value of the increase in the maximum intensity wavelength may indicate a value of the force or stress applied to the tetrapod nanocrystal. According to another embodiment, the difference in the luminescent response comprises a broadening of the photoluminescent spectrum of the one or more tetrapod nanocrystals. A value of the broadening may indicate a value of the force or stress applied to the tetrapod nanocrystal. For embodiments that employ a plurality of the tetrapod nanocrystals, the values of the increase in the maximum intensity wavelength or the values of the broadening of the photoluminescent spectrum may be used to produce a map of the force or the stress at locations of the nanocrystals.

EXAMPLES

Example 1

Seeded tetrapods consisting of a CdSe core with CdS arms are highly luminescent (see Talapin et al.) and are very symmetric objects. When placed under an anisotropic stress we have found a reduction in symmetry, which influences the electronic level structure. To fully quantify such effects, we have examined a series of samples under diverse conditions of stress and strain. Specifically, we have examined the luminescence from seeded dots, rods, and tetrapods placed in a diamond anvil cell (DAC) as a function of applied pressure in a highly hydrostatic medium, which transmits pressure nearly isotropically, as well as a non-hydrostatic medium, which transmits pressure anisotropically (i.e. produces an anisotropic stress). We compared the tetrapods to rods to separate out stress-induced strain effects in a single rod from effects specifically arising in a tetrapod consisting of connected rods. An additional difference between seeded rods and tetrapods is that the seed in the rod case is of wurtzite (wz) or hexagonal symmetry, while in the tetrapod case it is of zincblende (zb) or cubic symmetry. For this reason, we completed our studies by investigating simple wurtzite seeds under the same conditions of hydrostatic (i.e. isotropic) and non-hydrostatic (i.e. anisotropic) stress. With this set of experiments, we investigated the effects of deviatoric stresses (i.e. anisotropic stresses) on the luminescence of seeded tetrapods.

The particles under study were wz-CdSe/wz-CdS core/shell dots, wz-CdSe/wz-CdS core/shell rods, and zb-CdSe/wz-CdS core/shell tetrapods, with 4.4±0.6 nm, 4.0±0.4 nm, and 4.4±0.7 nm cores respectively. Dots were prepared following Li et al., and rods and tetrapods were prepared following Talapin et al. Structural and optical characterization demonstrate that the particles are of narrow size distribution. Transmission electron microscopy (TEM) images (FIGS. 1a-1c) reveal dots of 7.0±1.1 nm diameter, rods of 28.4±2.6 nm length×5.8±1.3 nm width, and tetrapods of 27.8±3.5 nm arm length×4.8±1.2 nm arm width. Absorbance and fluorescence spectra (FIGS. 1d-1f) show highly luminescent particles with broad absorption in the region below 500 nm, characteristic for CdS-containing particles, and a narrow photoluminescence (PL) peak of ~30 nm full-width at half-maximum, indicative of a monodisperse sample.

Figure 2:
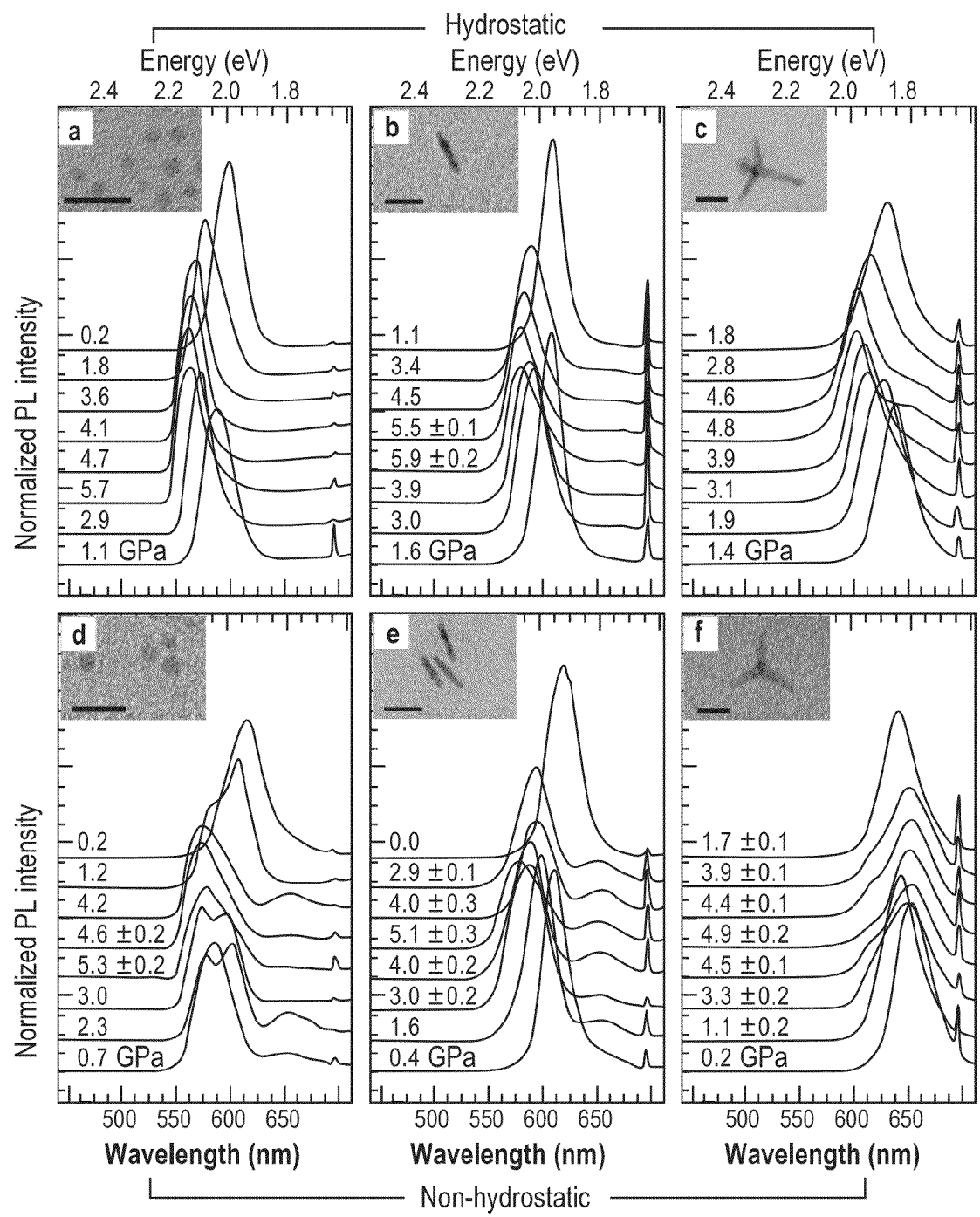
FIGS. 2a-2f provide fluorescence spectra of CdSe/CdS nanocrystals in a diamond anvil cell (DAC) under hydrostatic and non-hydrostatic pressure. DAC fluorescence traces in hydrostatic 1:1 v/v pentane:isopentane medium for CdSe/CdS (FIG. 1a) dots, (FIG. 1b) rods, and (FIG. 1c) tetrapods; and in non-hydrostatic toluene medium for CdSe/CdS (FIG. 1d) dots, (FIG. 1e) rods, and (FIG. 1f) tetrapods. Subsequent spectra at different pressure points are shown in stacked offsets. Pressure±pressure gradient (only if gradient ≧0.1) in GPa is labeled on the corresponding trace. Insets show TEM images of post-DAC recovered particles. All scale bars are 20 nm. Fluorescence spike ~694 nm is due to fluorescence from ruby grains, used to determine pressure inside the DAC.

The samples were dispersed in a hydrostatic (1:1 v/v pentane:isopentane) or non-hydrostatic (toluene) pressure medium, and loaded into the DAC, with an initial pressure of 0.5-1 GPa. Toluene freezes at 1.7 GPa and shows high viscosity behavior above ambient pressures, indicative of a highly anisotropic, non-hydrostatic pressure transmitting medium (e.g. see Herbst, C. A., et al. *J. Non-Cryst. Solids* 1994, 172, 265-71). The pressure in the DAC was increased to <6 GPa, and then decreased to ambient pressure. Fluorescence traces obtained during the experiment (FIG. 2) demonstrate highly contrasting behavior between hydrostatic and non-hydrostatic pressure conditions, and among particle geometries. The most obvious trend under hydrostatic pressure is a pressure-induced blue-shift of the PL (photoluminescence) peak. A slight asymmetric broadening of the peak at longer wavelengths is observed at higher pressures. The behavior under non-hydrostatic pressure (i.e. anisotropic compressive stress) is markedly different. For dots, the PL peak splits into a doublet at pressures above 0.7 GPa. For dots and rods, a shallower peak also typically arises at ~650 nm. The PL peak in tetrapods instead slightly red-shifts with increasing pressure, with the appearance of a small blue shoulder. The fluorescence behavior is reversible, with no apparent hysteresis, although the PL peaks are somewhat wider at the end of the experiment. The particles remained intact throughout the experiment as demonstrated by sample recovery post-compression (FIG. 2 insets); we found that above 6 GPa, recovered nanoparticles were broken due to the high non-hydrostatic pressure environment within the cell. We did not observe the abrupt PL intensity decrease or peak broadening associated with a phase transition to rock salt; due to the mechanically stiffer CdS shell on the surface, these particles likely undergo this phase transition at higher pressures. The sharp spectral peak around 700 nm is from fluorescence of the ruby grains used as a pressure gauge within the DAC (e.g., see Mao, H. K., et al. *J. Appl. Phys.* 1978, 49, (6), 3276-83).

To quantitatively evaluate the PL shifts of the particles, we fit the experimental data to a sum of Gaussian curves (see analysis methods below). PL peak energies as a function of pressure are shown in FIGS. 3a-3c, and the percentage of particles in the peak data point of curve R, calculated from the area under the fitted peak, shown in FIG. 3d. There are four notable observations from this analysis. First, under non-hydrostatic pressure for all three particle morphologies, two PL peaks are observed: a curve B, whose energy as a function of pressure matches with that of the peak under hydrostatic pressure, and a curve R, which does not exist under hydrostatic pressure conditions. The two peaks are likely due to fluorescence from two populations within the cell, rather than two allowed transitions within individual particles, since the energy difference between the two peaks is much greater than the thermal energy available. However, future single particle fluorescence experiments are required to confirm this assessment. That the curve B and hydrostatic peak energies match so well suggests that the particles emitting at the curve B experience a near-hydrostatic environment within the DAC, while those emitting at curve R are affected by the non-hydrostaticity. Second, under non-hydrostatic pressure for dots, the curve B further splits into at least two peaks, but possibly more, as evidenced by the greater spread in peak position (FIG. 3a). The hydrostatic pressure peak for dots, with a broader red side, is also fit to two peaks for comparison. This curve B splitting phenomenon is not observed for rods or tetrapods. Third, for dots and rods under non-hydrostatic pressure, the energy of the curve R changes somewhat (−5.6 and 5.2 meV/GPa respectively), while for tetrapods the curve R emission red-shifts at nearly two times this rate (−9.9 meV/GPa) (FIGS. 3a-3c insets). Fourth, tetrapods are clearly the most affected by the non-hydrostatic pressure, with more than 95% of the population in this curve R state (FIG. 3d). This demonstrates that tetrapods are significantly more suitable for strain sensing compared to quantum dots and nanorods. Under hydrostatic pressure (i.e. isotropic stress), the particles are isotropically compressed, while under non-hydrostatic pressure (i.e. anisotropic stress), the particles experience a net deviatoric stress which includes uniaxial and shear stresses. The difference between the two informs the net strain due only to non-hydrostatic stress. To investigate the optical effects of only non-hydrostatic stress on the tetrapods, the energy difference between the non-hydrostatic peak and hydrostatic shoulder (FIG. 2f) is plotted (FIG. 3e). We observe a clear red-shift with increasing stress.

Figure 4:
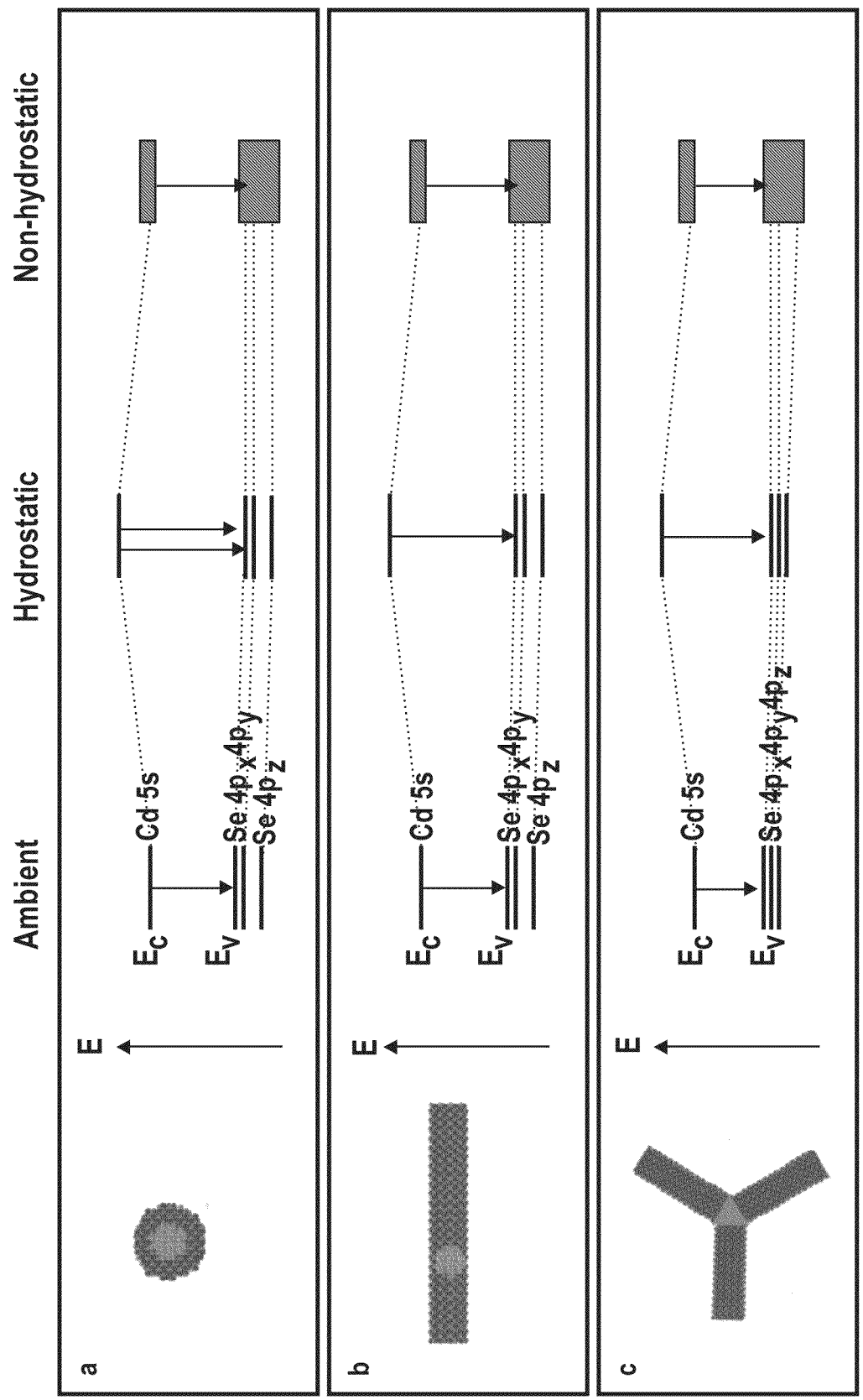
FIGS. 4a-4c provide theorized bandgap models for photoluminescence transitions for CdSe/CdS nanocrystals under ambient, hydrostatic, and non-hydrostatic pressure. Crystal structures and band diagram schematics for CdSe/CdS (FIG. 4a) dots (wz-CdSe core), (FIG. 4b) rods (wz-CdSe core), and (FIG. 4c) tetrapods (zb-CdSe core) at ambient pressure (left), under hydrostatic pressure (center), and under non-hydrostatic pressure (right). Under hydrostatic pressure, the bonds between all atoms are compressed, resulting in a blue-shift of the energy gap. Dots are sensitive to slight deviations from hydrostaticity, leading to a few observed optical transitions under hydrostatic pressure depending on the orientation of the dot with respect to the small deviatoric stresses. Under non-hydrostatic pressure, deviatoric stresses induce stretching in some bonds, resulting in an energy gap red-shift. Because the particles may be oriented in any direction within the DAC, deviatoric stress results in different crystallographic strain of the particles, broadening the ensemble electronic band structure.

A model to explain the observed behavior is shown in FIG. 4. In CdSe/CdS nanocrystals, the fluorescence recombination occurs in the CdSe core, with the electron relatively more delocalized throughout the nanocrystal while the hole is confined to the core. The conduction band is comprised mainly of Cd 5s orbitals. For dots and rods, with a wz-CdSe core, the valence band is comprised mainly of Se 4px and 4py orbitals; the valence band of tetrapods, which have a zb-CdSe core, is comprised of Se 4px, 4py, and 4pz orbitals. Under hydrostatic pressure conditions the crystal bonds are compressed, and the greater wavefunction overlap leads to a blue-shift of the energy gap, mainly due to an increase in the conduction band energy. Small deviatoric stresses lead to the observed fluorescence peak asymmetry particularly seen in dots. This effect is more obvious under non-hydrostatic pressure (i.e. anisotropic stress), where the peak data point of curve B for dots splits into at least two luminescent states due to stress. This effect has been previously observed for bulk CdSe stressed in different directions. For rods, curve B splitting is not as prominent due to the elongated CdS shell on the CdSe (100) faces; the mechanically stiffer CdS hinders compression along the CdSe c-axis. Therefore, fewer luminescent strain states are possible. Under higher non-hydrostatic pressure conditions, experimentally achieved by particle dispersion in toluene, some bonds in the crystals are pulled apart by torque, leading to a red-shift of the energy gap. Because the particles are randomly oriented with respect to the net uniaxial strain, the observed ensemble energy levels are broadened.

The distinction between tetrapods versus dot and rod particles is that the unique geometry of tetrapods makes them more physically sensitive to stress-induced effects. Once the medium has frozen (or become quite viscous) around the tetrapods, further application of anisotropic stress applies bending moments to each of the tetrapod arms, with each arm's bending moment dependent on its orientation relative to the principal stress axes. Thus the arms of the tetrapod act essentially as lever arms, subjecting the zb-CdSe core to large shear stresses so that some bonds are stretched and others compressed relative to the hydrostatic configuration. The data suggest that the net result of arm bending is a red-shifting of the energy gap. Consequently, forces which bend tetrapod arms may be optically detected.

While we considered other mechanisms for previously observed strain- and shape-dependent optical phenomena to explain our findings, they are ruled out given our experimental design. First, it has been hypothesized that the curve B-PL peak split in CdSe quantum-dot solids arising at non-hydrostatic pressure conditions is due to an energy transfer mechanism between particles. This cannot be the central mechanism in our experiment, since the nanoparticle sample is dilute. Second, the appearance of the curve R under non-hydrostatic pressure conditions is not due to a type I-type II heterostructure transition, since this peak is also observed in our bare CdSe dot pressure studies. Finally, an aspect ratio-induced crossover between the bands formed by the Se 4px 4py and the Se 4pz orbitals does not cause the curve R observed in the present study; the particle compression is too slight to increase the aspect ratio. However, under non-hydrostatic conditions the Se 4pz band may be at higher energy than the 4px and 4py bands for dots and tetrapods due to greater compression in the z-direction.

Example 2

CdSe/CdS core/shell tetrapods, with a CdSe core and CdS arms, have high quantum yields up to 60% due to quasi-type I band alignment of the heterostructure (see Talapin, D. V. et al.), and therefore present an optimal design for optical readout of local stresses. Our hydrostatic compression experiments in a diamond anvil cell demonstrated that the photoluminescence of CdSe/CdS tetrapods blue-shifts linearly with increasing hydrostatic pressure, a result of bond compression. Additionally, under increasing non-hydrostatic pressure, the tetrapod exhibits a linear photoluminescence red-shift, likely due to lever arm torque on the tetrapod core. These results provided evidence that the tetrapod might be useful as an optical strain gauge, capable of sensing and reporting environmental stresses.

In one embodiment, the optical response of tetrapods to non-hydrostatic stress is calibrated in a simple uniaxial geometry. Tetrapods were incorporated into single polyester fibers with known stress-strain properties and the tetrapod fluorescence was monitored under increasing tensile strain. CdSe/CdS tetrapods (4.8±1.2 nm arm diameter and 27.8±3.5 nm arm length) in low concentrations are easily incorporated into the fiber by dropping a few microliters of dilute solution onto the fiber. The solvent quickly evaporates, and red fluorescence (FIG. 5b) shifted from that of tetrapods in solution (FIG. 6a) is exhibited throughout, indicating that tetrapods are inside the fiber. Scanning electron microscopy (SEM) images of a fiber cross-section confirm that tetrapods are embedded within (FIG. 5c).

Figure 6A:
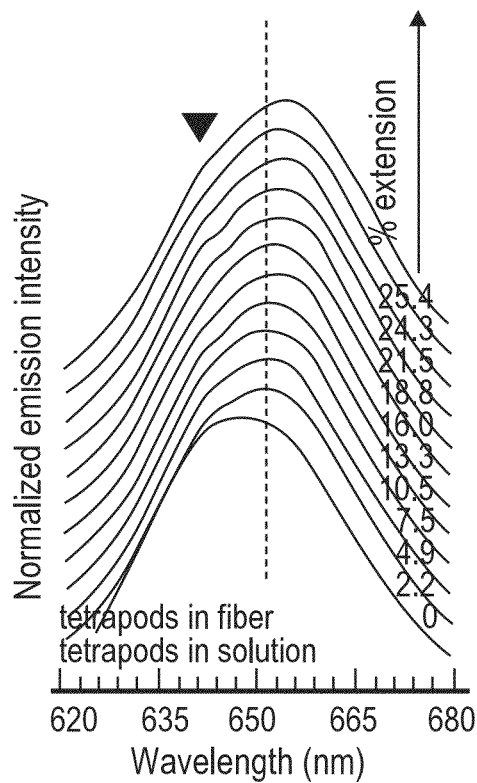
FIGS. 6a-6c show calibration of the tetrapod strain gauge.

Single polyester fibers with embedded tetrapods were affixed at both ends and the tetrapod fluorescence spectrum was monitored at a fixed spot with increasing tensile strain. A clear spectral red-shift is evident as a result of increasing fiber extension (FIG. 6a). This shift is detectable with a spectral resolution of 0.01 nm in our system. The slight blue shoulder in each trace (upside-down triangle), which matches the spectral peak of tetrapods in solution, is attributed to a fractional population of tetrapods on the surface of the fiber. Although the refractive indices of the fiber also change as the fiber is extended, this change is within ±0.02 and not large enough to induce the shifts we observe (see Venkataprasad Bhat, S. et al. Chem. Phys. Lett. 2006, 422, 323-327). The initial fluorescence wavelength maximum as well as the magnitude of the red-shift varies both spatially along the fiber as well as among different fibers, consistent with previous observations of mechanical variation in microstructure within and among single fibers (see Hosemann, R. Polymer 1962, 3, 349-392).

Figure 6B:
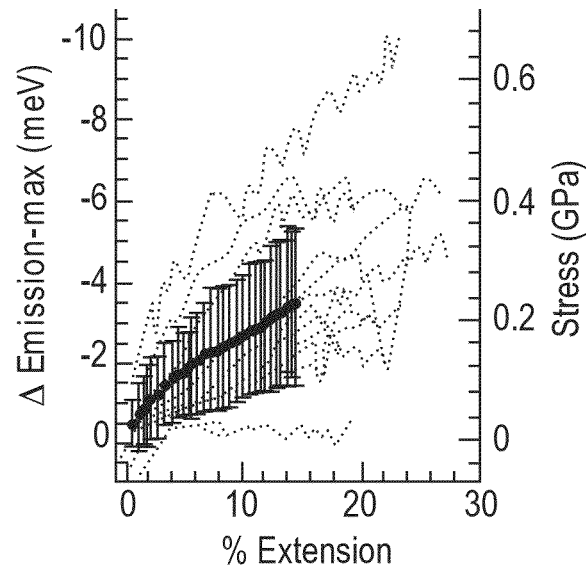
Figure 6C:
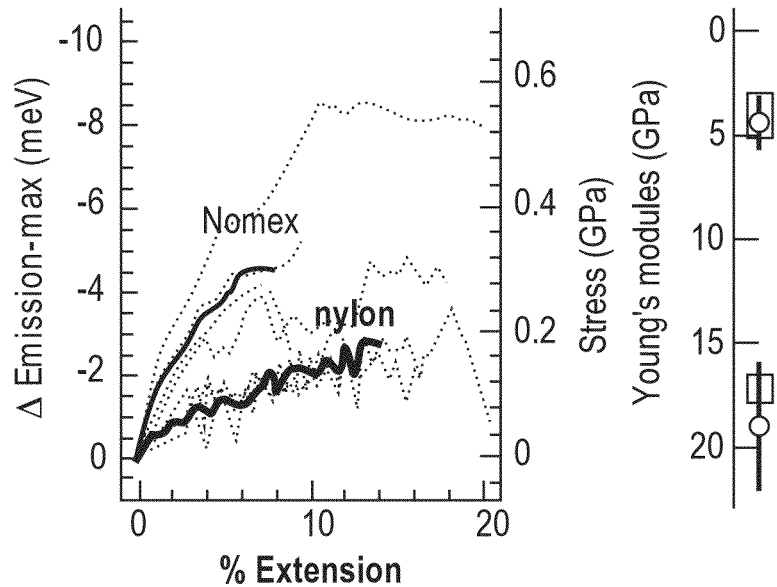

Applied stresses to the tetrapod from fiber strain directly affect the energy gap, and therefore we plotted the change in peak photoluminescence energy as a function of the fiber extension (FIG. 6b). The linear elastic regime and onset of plasticity are readily identified in the photoluminescence behavior. The average of individual fibers is expected to reflect bulk behavior. The average fluorescence slope versus true strain in the elastic regime was correlated with the known Young's modulus of 8.3 GPa in order to calibrate the strain gauge. We determined a fluorescence shift of −5.8±1.2 meV/GPa. This value is comparable to previous theoretical predictions (see Schrier, J. et al. J. Nanosci. Nanotechnol. 2008, 8, 1994-1998), and about one-fourth the magnitude of the photoluminescence blue-shift response to hydrostatic pressure (Choi, C. L. et al. Nano Lett. 2009, 9, 3544-3549). The calibration error is due to uncertainty from the linear fit; measurement error due to the spectral resolution and peak-fitting uncertainty corresponds to a stress resolution of 0.003 GPa.

Conventional measurement of the true stress in a fiber requires accurate knowledge of the diameter change, which is difficult to measure in small fibers. The tetrapod strain gauge avoids this difficulty by responding directly to the local true stress. As a proof-of-principle demonstration we applied the polyester-derived calibration to find the Young's moduli (E) of two high performance fibers of known E: Nomex (10 μm diameter), a stiffer fiber, and nylon (120 μm diameter), a more compliant fiber. We found E=18.9±3.0 GPa and 4.3±1.3 GPa for Nomex and nylon respectively, within the range of accepted values for these materials (FIG. 2c) (also see Chae, H. G. J. Appl. Polym. Sci. 2006, 100, 791-802); Lewin, M. Handbook of Fiber Chemistry (2007)). The reported standard deviation represents the error from the linear fit. The calculated E for Nomex is somewhat high, likely because we typically focused on a kink band in these thin fibers to easily mark the location for repeated measurements.

Figure 7A:
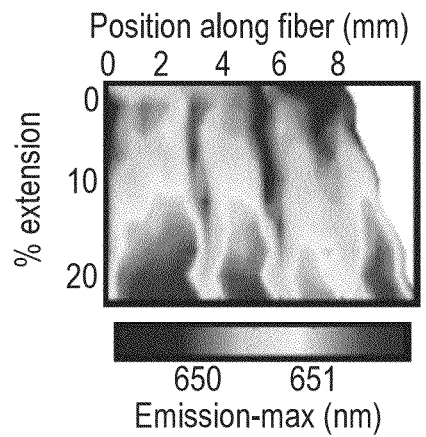
FIGS. 7a-7b show local stresses in a single polyester fiber.
Figure 7B:
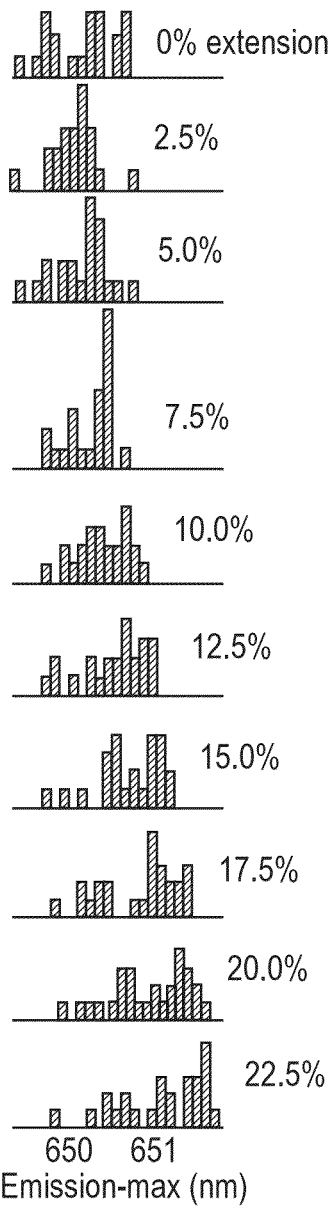

Polymer fibers do not respond homogeneously under tensile strain, and a local instability may ultimately become the site of fiber failure. Ediger and colleagues (see Lee, H.-N. et al. Science 2009, 323, 231-234) studied the local mobilities within a polymer glass below the glass transition temperature. Upon perturbation with a fixed stress, they observed not only an increase in the polymer mobility, as predicted by the Eyring model, but also an increase in the homogeneity of local mobility rates within the elastic regime. Further polymer creep in the plastic regime resulted in a re-spreading of the mobility rate distribution. They suggested that local stresses would mirror this behavior, with greater stresses in slower regions enabling higher mobility (see Lee, H.-N. et al.). We used the tetrapods to spatially resolve the local stress profile of a polyester fiber under increasing tensile strain (FIG. 7). Fluorescence from 20 adjacent spots 400 μm in length, of similar size to that studied by Ediger et al., was collected along the single fiber (FIG. 7a), with the fiber location of the first spot held fixed. The ensemble red-shift is clearly seen in the data. In addition, we observe a stress distribution narrowing in the elastic regime, followed by a distribution widening (FIG. 7b). This result indicates that the stress first becomes more homogeneous with strain and then increases in heterogeneity, correlating well with the previous observations of local mobility.

Figure 8A:
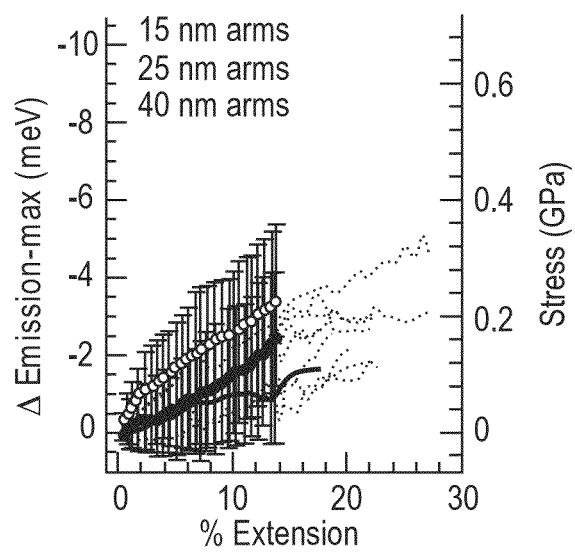
FIGS. 8a-8b show effects of size and morphology on stress sensing.
Figure 8B:
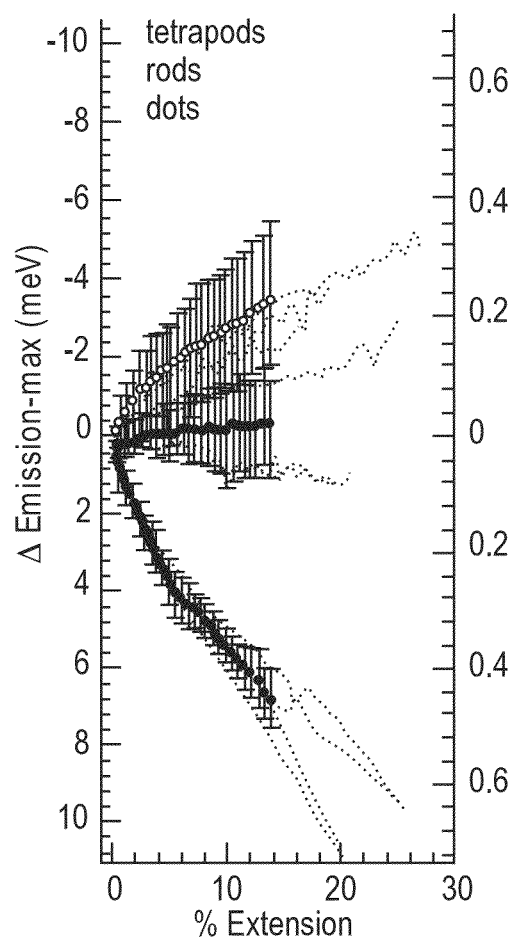

The CdSe/CdS tetrapods studied here present an optimal size and shape for sensing stress. Tensile stretching experiments on single polyester fibers embedded with tetrapods of similar diameter but longer (42.8±2.8) or shorter (15.1±1.7) arm lengths both exhibit reduced stress sensitivity (FIG. 8a). We hypothesize that while a longer tetrapod arm may increase the amount of torque on the CdSe core and thus the stress sensitivity, an arm that is too long should additionally buckle, reducing the stress sensitivity. The optimal arm aspect ratio for stress sensing will balance these two effects to provide maximum stress sensitivity. In addition, the tetrapod morphology is unqiue to sensing anisotropic stresses. Similar polyester fiber tensile experiments using CdSe/CdS quantum dots and rods demonstrate that these nanoscale geometries cannot specifically detect anisotropic stresses (FIG. 8b). Quantum dots (7.0±1.1 nm diameter) exhibited a blue-shift with increasing fiber strain, similar to their behavior under hydrostatic pressure (see Choi, C. L. et al.). Their compact shape may enable the dots to rotate within the fiber resulting in compression along the most compliant axis; alternatively, the dots may be smaller than the relevant length scale of anisotropy present in the system. Quantum rods, which from different viewing axes appear similar to either the dots or the tetrapods, exhibited either a slight red- or blue-shift with increasing tensile strain, suggesting that local rod orientation relative to the fiber affects the response to strain. No average net shift was observed for these particles.

Due to its nanoscale size, three-dimensional geometry, bright optical signature, and colloidal processability, the tetrapod nanocrystal possesses the ability to report both spatially- and dynamically-resolved stresses in many mechanical systems. The high quantum yield of the tetrapod enables stress measurements down to the single particle scale. Utilizing dark-field or super-resolution microscopies, the stress profile within a material may be mapped with an ultimate spatial resolution of a single tetrapod. An understanding of force effects relative to tetrapod orientation will be essential for these single particle studies. Future synthetic work will allow creation of tetrapods of different sizes sensitive to stresses of a variety of magnitudes, and tetrapods of different compositions with alternate optical band gaps and particle stiffness, thus expanding the range of material systems and processes that may be probed.

Example 3

In one embodiment, to sense cellular forces, the tetrapod nanocrystals will be specifically located to integrin sites, where mechanical communication occurs between the cell and the ECM. This localization requires biofunctionalization of the tetrapod nanocrystals, since they are typically synthesized and solubilized in organic solvents, and stabilized with long alkyl-chain phosphonic acid ligands (see Manna, L. et al. 2003. Nat. Mater. 2003 2, 382-385). There are many approaches to making water-soluble nanocrystals. In particular, a nanocrystal ligand exchange to functionalization with phytochelatin-related peptides results in nanocrystals highly stable in aqueous solutions over months (see Pinaud, F. et al. J. Am. Chem. Soc. 2004, 126, 6115-6123). These peptides can be easily functionalized with an additional peptide sequence of interest. To localize tetrapod nanocrystals to integrin sites, we designed a phytochelatin-related peptide with the KGRGDSP sequence, a motif from fibronectin, covalently attached at the N-terminal end (FIG. 10d). α5β1 integrins are found on the surface of the mammary cells and cardiomyocytes we propose to investigate, and these integrins bind with high affinity to the KGRGDSP sequence; α3β1 and αvβ1 also bind to a lesser degree (see Hersel, U. et al. Biomaterials, 2003, 24, 4385-4415). Following ligand exchange, we achieve colloidally stable tetrapod nanocrystals functionalized with RGD peptides. Furthermore, we have demonstrated that cardiomyocytes can successfully grow and exhibit beating on two-dimensional substrates covalently linked with a monolayer of functionalized tetrapod nanocrystals (FIG. 12a), indicating that these tetrappod nanocrystals are indeed biocompatible. As an alternative approach, we can use a recently designed biocompatible ligand that is easily functionalized with peptides and maintains high colloidal stability (see Liu, W. et al. J. Am. Chem. Soc. 2010, 132, 472-483).

Example 4

Synthesis of CdSe/CdS core-shell particles: CdSe/CdS dots were prepared by initial synthesis of wz-CdSe dots and subsequent growth of CdS shell layers, following Peng and colleagues (see Li, J. J. et al., J. Am. Chem. Soc. 2003, 125, (41), 12567-75). CdSe/CdS rods and CdSe/CdS tetrapods were prepared following Talapin and colleagues (see Talapin, D. V. et al., Nano Lett. 2007, 7, (10), 2951-59 hereby incorporated by reference).

Nanocrystal characterization: TEM images were obtained with a Phillilps Tecnai $G_2$ 20. Absorbance spectra were measured on a Shimadzu UV-3600 UV-Vis-NIR spectrophotometer with 1 nm slit widths. Ambient fluorescence spectra were measured with a Jobin Yvon Horiba Fluorolog fluorimeter with 400 nm wavelength lamp excitation and 2 nm slit widths; a photomultiplier tube was used as a detector for the spectral range 420-800 nm.

Diamond anvil cell studies: The diamond cell used was a Diacell (now Easylab, U.K) diamond anvil cell in a screw-driven mode. We used type Ia low-fluorescence diamonds with 350 micron culet size. The gasket hole was 150 microns, drilled with an electronic discharge machine, with a 69-100 micron pre-indentation. We used spring steel gaskets for 1:1 pentane:isopentane measurements and stainless steel gaskets for the toluene measurements. Annealed ruby grains were used for the measurement of pressure. Ruby fluorescence spectra were taken at 3-4 spots inside the DAC to quantify the pressure gradient across the cell. An argon ion laser with 488 nm excitation wavelength was used for all fluorescence studies.

Polymer fibers: For these experiments, transparent polyester thread (Coats & Clark, 90 μm diameter), transparent nylon thread (Sew Gude, 120 μm diameter), single fibers removed from spun Nomex (The Thread Exchange, 10 μm diameter), and Spectra thread (Gudebrod GX2, 130 den, 20 μm diameter) were used.

Incorporation of tetrapods into single polymer fibers: 1-5 μL of CdSe/CdS nanocrystals (9.1×10-10 M in toluene) were dropped onto a 3 mm (single spot studies) or 1 cm (stress profile studies) length of fiber, with a total of about 10-15 mol nanocrystals added to the fiber spot. The toluene quickly evaporates, resulting in single polymer fibers with nanocrystals embedded within (FIGS. 5b and 5c). In most experiments, a kink band or a transverse band inherent to the fiber, or a black permanent mark on the fiber, was used as a reference spot to collect fluorescence data at the same location with subsequent fiber extension.

Tensile fluorescence experiments: Each end of a single polymer fiber was secured by winding under a washer and screw to a platform on a micrometer stage, with about 2 cm initial distance between the screws. One platform was fixed in position while the other could be controlled using the micrometer stage screw. The distance between the two screws was calibrated with the micrometer screw reading using digital calipers. A micrometer stage controller, was used extend the fiber.

The nanocrystal fluorescence was excited with a 488 nm Ar+ laser (Lexel Laser, Inc., 95) with 2 mW power and 400 μm spot size at the sample. Brightfield and fluorescence images were taken with a digital microscope camera (Paxcam 2+). The fluorescence spectra were monitored using a home-built inverted fluorescence microscope with a spectrometer (Acton Research Corporation, SpectraPro-300l) and CCD detector (Princeton Instruments, Model 7509-0001). Exposure times of about 0.1 s were used to collect spectra.

For stress profile experiments, fluorescence was monitored similarly, with a reference mark on the polyester fiber used as the initial point for each subsequent fiber extension. Tetrapods were embedded over an 8 mm length of single polyester fiber. A fluorescence spectrum was taken at 20 adjacent spots of 400 μm spot size at 0% fiber extension. Subsequent spectra were taken at 2.5%, 5%, 7.5%, 10%, 12.5%, 15%, 17.5%, 20%, and 22.5% extension. The length of fiber exhibiting tetrapod fluorescence increased as the fiber was extended and spectra were collected over this entirety, with the first spectrum always taken at the reference position (FIG. 7a).

Analysis methods: Spectral curvefits and statistical analyses were performed using Mathematica 7. Ruby peak spectra, taken at a high spectral resolution, were fit to two Lorentzian peaks. Nanocrystal fluorescence spectra, taken for a large spectral range, were fit to a sum of one to four Gaussian peaks and one Lorentzian peak. Gaussian peak 1 was used to fit the main PL curve B; Gaussian peak 2 was added to the sum for dot experiments in the case of curve B splitting. Gaussian peak 3 was used to fit the red peak arising under non-hydrostatic pressure conditions. Gaussian peak 4 was used to fit any residual broad surface state luminescence appearing ~800 nm. The Lorentzian peak was added to the sum if the ruby fluorescence peak in the nanocrystal spectrum was observed. Standard error in peak position from the fit with the experimental data was calculated and used as the value for the error bars in FIG. 3a-c. Standard errors and the covariance of curve B and curve R positions for tetrapods were used to calculate the error bars in FIG. 3e. All spectra and graphs were plotted using Plot 0.997.

Strain gauge calibration and Young's modulus measurements: The tetrapod fluorescence emission-maximum in polyester fiber was averaged from 17 individual experiments and plotted versus the true strain $\epsilon_t$ ($\epsilon_t=\ln(1+(\%\ \text{extension}/100))$). The slope in the elastic region was determined using a linear least squares fit on the first five data points, representing data from $\epsilon_t=0$ to 0.022 (0% to 2.2% fiber extension), with $r^2=0.99$. The error reported represents the 95% confidence interval for the fit in slope. The tetrapod fluorescence red-shift as a function of stress was then calculated using the reported Young's modulus for this polyester fiber.

To calculate the Young's modulus in single Nomex and nylon fibers using the polyester-derived calibration, we determined the slope of the average emission-maximum versus strain for these fibers as described for polyester above. Four Nomex experiments and five nylon experiments were performed to obtain the average values. The slope in the elastic region for Nomex was determined using the first 12 data points, representing data from $\epsilon_t=0$ to 0.017 (0% to fiber extension), with $r^2=0.95$. The slope in the elastic region for nylon was determined using the first 10 data points, representing data from $\epsilon_t=0$ to 0.049 (0% to fiber extension), with $r^2=0.88$. In each case, a maximum $r^2$ and subsequent difference in slope were used to determine the elastic limit. The error in measured Young's modulus for both Nomex and nylon represents the 95% confidence interval for the fit in slope.

Mechanical behavior of single fibers with and without embedded tetrapods: The percent extension to failure was measured for single fibers with and without tetrapods embedded, reported as [with tetrapods; without tetrapods]. Polyester: [21.2±3.7; 23.4±2.2], Nomex: [16.0±12.1; 30.9±10.4]; nylon: [15.4±1.5, 16.9±1.8]. The results with and without tetrapods are within error. There is some difference in percent extensions to failure and large standard deviations for Nomex. This may be due to the thin diameter of Nomex, which makes fiber manipulation difficult. The location of fiber failure for all three fibers was unaffected by intercalated tetrapods.

Example 5

The breast epithelial cell-stroma interaction is a critical regulator of cell polarity, proliferation, differentiation, and migration. This crosstalk between the epithelia and stroma is important as misregulation of these interactions can promote tumorigenesis and invasion. Type I collagen is the most prevalent component of the stromal ECM, and in humans, collagen-dense breast tissue is one of the single largest risk factors for developing breast cancer (Provenzano, P. P., Inman, D. R., Eliceiri, K. W., Knittel, J. G., Yan, L., Rueden, C. T., White, J. G., and Keely, P. J. 2008. *BMC Med* 6:11.). Recent studies show that ECM remodeling and collagen cross-linking stiffen the tissue stroma to promote tumor growth, motility and invasion, enhance cancer cell survival, enable metastatic dissemination, and facilitate the establishment of tumor cells at distant sites (Erler, J. T., and Weaver, V. M. 2009. *Clin Exp Metastasis* 26:35-49). Interestingly, tumor cells often localize near dense collagen where they reorganize the collagen matrix to facilitate local invasion (Provenzano, P. P., Eliceiri, K. W., Campbell, J. M., Inman, D. R., White, J. G., and Keely, P. J. 2006. *BMC Med* 4:38). By secreting matrix metalloproteases (MMPs) and lysyl oxidase (LOX), tumors are directly involved in ECM remodeling and stiffening (Kessenbrock, K., Plaks, V., and Werb, Z. *Cell* 141:52-67).

A causal connection relationship between increased collagen stiffness and tumorigenesis has recently been shown in a HER2 model of breast cancer (MMTV-Neu). Tumor initiation is accompanied by collagen crosslinking, which results in ECM stiffening, increased formation of focal adhesions and increased invasion (Levental, K. R., Yu, H., Kass, L., Lakins, J. N., Egeblad, M., Erler, J. T., Fong, S. F., Csiszar, K., Giaccia, A., Weninger, W., et al. 2009. *Cell* 139:891-906). Reduction of LOX-mediated collagen crosslinking impedes malignant progression, indicating that collagen crosslinking directly affects tumorigenesis. In addition, the stiffness of other matrix components such as fibronectin can also affect cell behavior (Kubow, K. E., Klotzsch, E., Smith, M. L., Gourdon, D., Little, W. C., and Vogel, V. 2009. *Integr Biol (Camb)* 1:635-648); increased fibronectin accumulates at future sites of metastasis and promotes tumor cell colonization in these secondary tissues (Kaplan, R. N., Riba, R. D., Zacharoulis, S., Bramley, A. H., Vincent, L., Costa, C., MacDonald, D. D., Jin, D. K., Shido, K., Kerns, S. A., et al. 2005. *Nature* 438:820-827). The stress and strain of fibronectin was measured using a FRET-based technique after adding chemical crosslinks (i.e. paraformaldehye). This study serves as a good benchmark with which we can compare measurements we make with the tQDs.

Although the stiffness of these ECM components influences disease progression, our understanding of the mechanical properties of collagen and fibronectin fibers is incomplete. In particular, the microdomain stress and strain properties of these fibers are unknown. This is important, as cancer biologists have been crosslinking fibers by adding chemicals or utilizing enzymes to change the stiffness without a molecular understanding of how they are altering fiber characteristics (Levental, K. R., Yu, H., Kass, L., Lakins, J. N., Egeblad, M., Erler, J. T., Fong, S. F., Csiszar, K., Giaccia, A., Weninger, W., et al. 2009. *Cell* 139:891-906). We believe that our tQD optical force sensors will allow us to gain insight into the biological properties of collagen and fibronectin, and are a natural extension of our previous studies using synthetic polymer fibers (Choi, C. L., Koski, K. J., Olson, A. C. K., Baker, J. L., and Alivisatos, A. P. 2010. A nanocrystal strain gauge for luminescence detection of mechanical forces. *Manuscript submitted*).

We have already incorporated tQDs into synthetic polymer fibers to probe the mechanical properties of the fibers. The macroscopic behaviors of such fibers, such as the stress-response to strain, are well understood. We calibrated the tetrapod strain gauge by incorporating fluorescent tQDs into single polyester fibers and monitoring the fluorescence shift as the fibers were extended. Using this calibration, we correctly determined the Young's modulus (E) of single nylon (E=3-5 GPa) and Nomex (E=12-17 GPa) fibers. In addition, the tQDs were used to investigate the spatial distribution of stresses in a single polyester fiber as a function of strain, which could not previously be measured. These results support previous observations of polymer mobility in response to an external load (Lee, H.-N., Paeng, K., Swallen, S. F., and Ediger, M. D. 2009. *Science* 323:231-234). We propose similarly to use tQDs to probe the mechanical behavior of biological fibers. We will focus here on studies of collagen fibers, because we are primarily concerned with cell-ECM communication and type I collagen is an up-regulated gene in breast cancer. However, the techniques developed here will provide a platform to investigate other biologically important one-dimensional systems where stresses play a crucial role, including muscle fibers and arteries.

We will embed tetrapods at a dilute amount into bundles of type I collagen fibers in a simple tensile experiment, and will confirm that they are within the fibers using scanning electron microscopy. The typical dimension of a collagen fiber bundle is about 10 µm in diameter, similar to that of the synthetic polymer single fibers we used in our previous work. We will affix each end of an aligned collagen fiber bundle to a solid support (Lee, P., Lin, R., Moon, J., and Lee, L. P. 2006. *Biomedical Microdevices* 8:35-41). The distance between the solid supports, controlled by a micrometer stage, will be increased, and the fluorescence of tetrapods within the fibers monitored as a function of increasing fiber extension. We will be able to observe the collagen fiber stress response to strain. Previous calculations determined a Young's modulus of 4.8 GPa for collagen fibers (Lorenzo, A. C., and Caffarena, E. R. 2005. *J. Biomechanics* 38:1527-1533), a value that lies well within the dynamic range of the tQD strain gauge (Choi, C. L., Koski, K. J., Olson, A. C. K., Baker, J. L., and Alivisatos, A. P. 2010. A nanocrystal strain gauge for luminescence detection of mechanical forces. *Manuscript submitted*). We will compare our observations with literature values to confirm the accuracy of our measurements.

Additionally, the tQDs will enable us to determine the spatial distribution of stresses along the fiber, information that cannot currently be obtained by any other technique. Fluorescence spectra will be taken along the fiber with resolution down to 1 µm, creating stress profiles as a function of strain similar to those determined for single polyester fibers. Thus, the exact stress at each spot along the fiber will be quantified. In addition, the local stress is an important reporter of the local polymer chain mobility, as larger stresses are present at sites of increasing polymer mobility. We will therefore be able to gain a quantitative picture of collagen mechanics and dynamics in an unperturbed collagen fiber, and the response under an imposed and increasing fiber strain.

Once the fundamental mechanical properties of the collagen fibers are understood, we can begin to probe biologically important perturbations of the system. Biological and chemical cross-linkers, such as LOX and ribose, play an important role in collagen stiffening. We will examine the mechanical response of the collagen fibers as these factors are introduced into the system. In the simplest experiment, the stresses along an unperturbed fiber will be mapped in a manner identical to that in the tensile studies. The fiber will be removed from the microscope stage, incubated in ribose, and then imaged again on the microscope, with spatial snapshots taken over time. Although we will not be able to observe the mechanical response simultaneously with ribose addition, we will be able to compare, in a two-state manner, the mechanical profiles before and after the perturbation. In addition, we will be able to track the mechanical profile post-perturbation as a function of time up to the fully stiffened system. We also expect that the initial response to ribose may not be significant, as the fiber stiffening occurs over days.

Alternatively we will fix the fibers on a glass surface with a surrounding buffer medium. Ribose will be added to the solution, and we will track changes in stress along the fiber in real time. This method provides two additional advantages, in that i) it will be much simpler to locate the spatial can be definitely tracked, and ii) we will be able to observe any immediate mechanical response to ribose addition in the collagen fiber. While it is possible that the fiber may move, we have done similar initial experiments on spider silk, which supercontracts upon addition of water. Although the silk morphology is altered upon water addition, the silk remains on the glass surface, and we are able to maintain focus on the fiber and track changes in fluorescence over time.

In both methods we will be able to quantify the absolute stresses, and track the changes upon ribose perturbation in stress profile videos, resolved over space and time. Similar experiments will be done on other collagen cross-linking agents, including UVA light and LOX enzyme secreted from conditioned media, to provide a more comprehensive understanding of this fiber.

The strategies employed here may also be used to investigate the mechanical behavior of other important ECM protein fibers, including fibronectin, elastin, and laminin, to gain a fuller picture of the mechanical environment of the ECM.

The structure and behavior of the collagen fibers should be minimally affected upon addition of tQDs. It is known that loading large amounts of nanoparticles inside a polymer fibers can change its mechanical properties (Kulpinski, P. 2005. *Journal of Applied Polymer Science* 98:1793-1798; Chen, X. L., Li, C. Z., Shao, W., Du, H. L., and Burnell-Gray, J. S. 2007. *Journal of Applied Polymer Science* 105:1490-

1495). For example, if nanoparticles can act as cross-linkers between individual polymer chains within a fiber, the resulting composite fiber may be stiffer, or have a larger percent extension to failure. We will adjust the concentration of dilute tQDs added to the collagen fibers, and ensure that the fibers remain largely unaffected by comparing mechanical properties of collagen fibers with tQDs embedded to those without. Collagen-tQD composite fibers may in fact demonstrate unique mechanical behaviors, interesting in their own right and potentially useful for other studies (Stanishevsky, A., Chowdhury, S., Chinoda, P., and Thomas, V. 2008. *J. Biomed. Mater. Res. Part A* 86A:873-882).

tQDs are easily incorporated into single synthetic polymer fibers upon addition of a small volume of a dilute tetrapod solution directly to the fiber; the solvent quickly evaporates and the resulting fiber has tQDs embedded within. No additional functionalization to anchor tetrapods inside the fiber is necessary. However, it is possible that embedding tetrapods inside collagen fibers may require a collagen-specific sequence on the nanocrystal surface. In this case, we will functionalize the tetrapod surface with phytochelatin-related peptides modified with covalently attached molecules such as anti-collagen.

Example 6

Cell-generated forces are important for the biology and function of many cell types. For example, heart cells contract in a periodic fashion to pump blood through the circulatory system and muscle cells contract to coordinate movement of the limbs. Cell migration also requires force generation, and is important in physiologic processes such as wound healing and embryonic development, and also in many diseases including cancer metastasis. Metastasis is a multistage process whereby cancer cells leave the primary tumor site, enter the bloodstream, and seed new organs for colonization. It is therefore important to better understand how normal and tumor cells generate force and interact with their environments. This includes intracellular events in response to force such as protein scaffolding at focal adhesions, cytoskeletal remodeling, and transcriptional changes.

For cells to move, cells generate traction forces through surface receptors such as integrins that are bound to ECM. When integrins are engaged, they cluster and form focal adhesions. Signaling pathways downstream of integrins couple the ECM to the cell's cytoskeleton through protein scaffolding complexes, which include molecules such as vinculin, talin, paxillin, Src kinase, and focal adhesion kinase (FAK), which then interact with actin filaments (Alenghat, F. J., and Ingber, D. E. 2002. *Sci STKE* 2002:pe6; Berrier, A. L., and Yamada, K. M. 2007. *J Cell Physiol* 213:565-573). Cell extension occurs through the formation actin-rich processes, which involve polymerization of actin coupled with forward displacement of the plasma membrane, resulting in cell-generated forces.

Quantitative understanding of cellular forces exerted during cell migration has been intensely studied for many years. Most notably, groups have approached this problem by using high-density arrays of elastomeric microfabricated pillars, and deducing the magnitude of the traction forces by measuring the bending of these pillars and correlating them with actin localization (du Roure, O., Saez, A., Buguin, A., Austin, R. H., Chavrier, P., Silberzan, P., and Ladoux, B. 2005. *Proc Natl Acad Sci USA* 102:2390-2395; Pelham, R. J., Jr., and Wang, Y. 1997. *Proc Natl Acad Sci USA* 94:13661-13665; Tan, J. L., Tien, J., Pirone, D. M., Gray, D. S., Bhadriraju, K., and Chen, C. S. 2003. *Proc Natl Acad Sci USA* 100:1484-1489). These techniques allow us to capture some information about cell-generated forces, but are ultimately limited in that pillars are generally spaced apart by ~10 mm, which limits spatial resolution and can only be used to study forces greater than 12 nN (Tan, J. L., Tien, J., Pirone, D. M., Gray, D. S., Bhadriraju, K., and Chen, C. S. 2003. *Proc Natl Acad Sci USA* 100:1484-1489; Claycomb, W. C., Lanson, N. A., Jr., Stallworth, B. S., Egeland, D. B., Delcarpio, J. B., Bahinski, A., and Izzo, N. J., Jr. 1998. *Proc Natl Acad Sci USA* 95:2979-2984). Furthermore, the pillars cannot be used to study 3D systems and force measurements cannot be made in real-time with simultaneous monitoring of biochemical signaling events, cytoskeletal dynamics, or gene expression changes. However, the existing technologies do allow us to evaluate the measurements we make with our tQDs. We hypothesize that tQDs can be used to study cell generated forces quantitatively in real-time with high spatial resolution, while simultaneously monitoring intracellular signaling events.

Experimental strategy, methodology, and analysis. Substrates of a monolayer of RGD-functionalized tQDs covalently attached to a glass slide will be prepared. Covalent attachment of tQDs to the slide is essential since we have found that non-specifically bound tQDs diffuse into the cell media or are phagocytosed by cells. This attachment will be achieved using an N-hydroxysulfosuccinimide/1-Ethyl-3-(3-dimethylaminopropyl)-carbodiimide coupling reaction mechanism, linking carboxy-terminated ligands on the tQD surface to an amine-functionalized glass slide. As a control to ensure that cells are specifically binding to tQDs via integrin sites, we will also prepare similar substrates with RDG-functionalized tQDs (Hersel, U., Dahmen, C., and Kessler, H. 2003. *Biomaterials* 24:4385-4415). tQD emission intensities over a 2D area will be collected through an acousto-optic tunable filter and detected by an avalanche photodiode. This will result in simultaneous fluorescence spectra over a 2D area with 1 μm spatial resolution and 1 ms time resolution. The resulting stress maps will provide a quantitative picture of cellular force behavior in 2D.

The fluorescence signal from the close-packed monolayer of tQDs on the substrate provides enough signal to take 100 spectra per second. This rate is sufficient to image changes from cell beating, which beat at 1-3 times per second. Because cardiomyocytes generate a periodic on-off nN force signal during each contraction, we can correlate and ensure tQD optical switching behavior. This experiment will further validate the use of tQDs in a well-characterized system that generates an on-off force.

We will start with a mouse atrial cardiomyocyte line derived by Claycomb et al., the HL-1 line (Claycomb, W. C., Lanson, N. A., Jr., Stallworth, B. S., Egeland, D. B., Delcarpio, J. B., Bahinski, A., and Izzo, N. J., Jr. 1998. *Proc Natl Acad Sci USA* 95:2979-2984). We have chosen this line because HL-1 cells can be easily grown in culture, can be passaged, retain differentiated cardiac morphological and biochemical properties and importantly, spontaneously contract in culture. We have successfully established HL-1 cultures, and have shown that they can contract on biofunctionalized tQDs (FIG. 11a). We plan to use fluorescence microscopy and spectroscopy to record optical shifts in tQD fluorescence and measure the forces generated by these cells in vitro. The values we obtain from the tQDs will be compared to literature values, and will serve as a benchmark to compare our technology with currently used methods.

We will extend this experiment to use primary mouse cardiomyocytes isolated from neonatal mice that express GFP- or RFP-Lifeact using established protocols. Lifeact is a novel, live-cell probe that can be used to image actin dynamics in real time (Riedl, J., Crevenna, A. H., Kessenbrock, K., Yu, J. H., Neukirchen, D., Bista, M., Bradke, F., Jenne, D., Holak, T. A., Werb, Z., et al. 2008. *Nat Methods* 5:605-607). This tool and transgenic mice expressing both GFP- and RFP-Lifeact were recently developed and described in Riedl, J., Flynn, K. C., Raducanu, A., Gartner, F., Beck, G., Bosl, M., Bradke, F., Massberg, S., Aszodi, A., Sixt, M., et al. *Nat Methods* 7:168-169. These primary cardiomyocytes will be useful because we will be able to visualize actin and simultaneously measure force in real-time.

In addition to a lock-in measurement, we will investigate the effects of stress on force-generation in cardiomyocytes. For example, occlusion of the coronary arteries causes hypoxic stress on the cardiac muscle, which ultimately leads to cell death. Prior to cell death, how do cardiomyocytes respond to such stresses? Are forces generated by hypoxic cells diminished or augmented? We plan to address this question by culturing both the HL-1 cells and the primary cardiomyocytes in our low oxygen incubator, which is capable of maintaining an oxygen concentration down to 0.1%. We will then measure the forces generated in hypoxic conditions using the tQDs to determine i) whether hypoxia affects force generation, and ii) at what oxygen percentage does this effect occur. Since we are able to take both brightfield video as well as fluorescence spectra using the same microscope, we can correlate changes in cell behavior and morphology with mechanical differences reported by the tQDs in different hypoxic conditions.

Cell migration is important for many biological processes including wound healing. One of the most widely used assays to study this is the scratch assay (Liang, C. C., Park, A. Y., and Guan, J. L. 2007. *Nat Protoc* 2:329-333). Briefly, cells are grown to confluency and then a pipette tip is used to scratch the cells off the plate and disrupt the monolayer, leaving an open "wound". Over time, the cells will migrate to fill the open area, which can be monitored using time-lapse microscopy (FIG. 11c). This experiment will extend our previous study by measuring cell-generated forces during cell migration.

We plan to use this assay to measure forces generated by mammary epithelial cell (MEC) lines. These cells have already been successfully cultured on a 2D tQD substrate (FIG. 11b). A number of different lines are chosen based on the mode of cell migration used (Friedl, P., and Wolf, K. *J Cell Biol* 188:11-19). We will use the 4T1 line, which is an aggressive and metastatic mouse line that has a number of sublines that do not metastasize (4TO7, 67NR); the MDA-MB-231 line, which is a commonly used metastatic human line; and the NMuMG line, which is a normal mammary epithelial line used to study the effects of TGFβ-induced epithelial-mesenchymal transition. In response to TGFβ, NMuMG cells change their morphology from an epithelial, cobblestone appearance to an elongated, more motile, spindle appearance (Miettinen, P. J., Ebner, R., Lopez, A. R., and Derynck, R. 1994. *J Cell Biol* 127:2021-2036). TGFβ is upregulated in cancer and promotes cell motility and metastasis (Hanahan, D., and Weinberg, R. A. 2000. *Cell* 100:57-70). We can therefore investigate the effects of TGFβ on cell-generated forces.

We will infect the cells with expression vectors containing GFP-Lifeact to visualize the actin cytoskeleton. This will allow us to simultaneously measure force and cytoskeletal dynamics in real-time. We have already started to transduce MEC lines using lentiviruses to create GFP-Lifeact cells. We will use total internal reflection (TIRF) microscopy to look only at the cell membrane surface, which will allow us to image the cytoskeleton, as well as protein localization at the membrane and focal adhesions (discussed below). Our lab is equipped with a TIRF microscopy system without output through a spectrometer and imaged on a charged-coupled device (CCD). This enables us to obtain spectral information from the system, with wavelength resolution to 0.01 nm.

In addition, we will detect downstream intracellular events such as focal adhesion formation and transcription factor translocation. During cell migration, cells exert forces through integrins, which recruits proteins such as vinculin, talin, paxillin, Src kinase, and focal adhesion kinase (FAK) (Alenghat, F. J., and Ingber, D. E. 2002. *Sci STKE* 2002:pe6; Berrier, A. L., and Yamada, K. M. 2007. *J Cell Physiol* 213: 565-573). To monitor protein scaffolding events at the focal adhesion, organoids will be transduced with viruses containing GFP-vinculin, GFP-talin, or GFP-FAK prior to being embedded, and visualized by TIRF microscopy. These expression constructs are readily available in our lab or from Addgene. This will allow us to simultaneously measure force and monitor biochemical signaling events at focal adhesion in real-time. Other groups have successfully used GFP-tagged focal adhesion proteins to understand the relationships between force and focal adhesion assembly (Balaban, N. Q., Schwarz, U. S., Riveline, D., Goichberg, P., Tzur, G., Sabanay, I., Mahalu, D., Safran, S., Bershadsky, A., Addadi, L., et al. 2001. *Nat Cell Biol* 3:466-472). Of note, both the tQDs and GFP can be excited simultaneously using a 488 nm laser line, allowing us to make simultaneous measurements. Furthermore, we can image multiple colors by utilizing additional fluorescently-tagged proteins (i.e. CFP, RFP) to monitor transcription factor translocation into the nucleus. Proteins such as paxillin are translocated upon sensing force (Woods, A. J., Roberts, M. S., Choudhary, J., Barry, S. T., Mazaki, Y., Sabe, H., Morley, S. J., Critchley, D. R., and Norman, J. C. 2002. *J Biol Chem* 277:6428-6437), and can thus alter gene expression. To investigate changes in transcription, we will utilize fluorescent reporters of transcriptional activity such as TOP-GFP, a reporter of β-catenin activity (Vermeulen, L., De Sousa, E. M. F., van der Heij den, M., Cameron, K., de Jong, J. H., Borovski, T., Tuynman, J. B., Todaro, M., Merz, C., Rodermond, H., et al. *Nat Cell Biol* 12:468-476).

While we have demonstrated that cardiomyocytes and mammary epithelial cells can grow on RGD-tetrapod substrates, it is possible that for continued growth and development they may require an additional thin layer of ECM on top of the tQDs. To address this, we will coat the tQD substrate with a thin layer of gelatin/fibronectin and incubate this solution for 2 hours prior to adding the cells.

Example 7

The ECM is a key regulator of normal homeostasis and cellular behavior. Although cells cultured on tissue culture plastic are intensively studied in biology, important signals are lost when cells are cultured on 2D plastic substrata. Many of these crucial microenvironmental cues may be restored using 3D cultures of laminin-rich or collagen-rich ECM. These 3D culture assays allow phenotypic discrimination between nonmalignant and malignant mammary cells, as the former grown in a 3D context form polarized, growth-arrested acinus-like colonies whereas the latter form disorganized, proliferative and non-polar colonies (Lee, G. Y., Kenny, P. A., Lee, E. H., and Bissell, M. J. 2007. *Nat Methods* 4:359-365). In addition, signaling pathways that function in cells cultured on plastic become reciprocally integrated when the cells are exposed to ECM. Therefore, 3D culture systems provide a more physiologically relevant approach to the analysis of gene function and cell phenotype ex vivo, and are a valuable tool for modeling cancer genes and pathways in a structurally appropriate context (Debnath, J., and Brugge, J. S. 2005. *Nat Rev Cancer* 5:675-688; Lee, G. Y., Kenny, P. A., Lee, E. H., and Bissell, M. J. 2007. *Nat Methods* 4:359-365). However, the relationship between force generation, cytoskeletal remodeling, and gene expression changes in 3D cannot be studied using current technologies. We hypothesize that tQDs can be used as optical force sensors in 3D culture systems to gain a deeper understanding of how force, focal adhesion formation, cytoskeletal remodeling, and gene expression changes are linked.

To incorporate tQDs with MEC lines, we will first incubate MEC lines on low adhesion plates with tQDs. The tQD-studded cells will then be embedded into Matrigel or collagen matrices with growth factors to induce cell migration and branching. The RGD biofunctionalization will allow tQDs to bind to integrins, and additional functionalization described below will allow tQDs to simultaneously bind and anchor to the ECM. tQD stress-sensing in 3D matrix materials is a natural extension of stress-sensing experiments in their 1D counterparts, i.e. collagen fibers (Example 5). We will use both mouse and human breast cancer cell lines (i.e. 4T1, MCF10A, HMT-3522 and MDA-MB-231 cells). The MCF10A is chosen because it is a human line commonly used to study acinar formation (Debnath, J., and Brugge, J. S. 2005. *Nat Rev Cancer* 5:675-688; Zhan, L., Rosenberg, A., Bergami, K. C., Yu, M., Xuan, Z., Jaffe, A. B., Allred, C., and Muthuswamy, S. K. 2008. *Cell* 135:865-878); the HMT-3522 line is a human series established from a reduction mammoplasty of a nonmalignant breast lesion that has subsequently developed tumorigenic properties in culture (Weaver, V. M., Lelievre, S., Lakins, J. N., Chrenek, M. A., Jones, J. C., Giancotti, F., Werb, Z., and Bissell, M. J. 2002. *Cancer Cell* 2:205-216).

Our lab and others have successfully used 3D cell culture to model the physiologic 3D environment of cells (Lee, G. Y., Kenny, P. A., Lee, E. H., and Bissell, M. J. 2007. *Nat Methods* 4:359-365). These "embedded cells" display very different behaviors when cultured in 2D versus 3D. For example, the invasive and metastatic capacity of these cells can be easily visualized when cultured in 3D (FIG. 12*b*), but not in 2D (FIG. 12*a*). We plan to use time-lapse confocal microscopy to investigate cell migration in 3D, and simultaneously measure the force exerted by the cells using tQDs. This study is the first to directly measure cell-generated force in a 3D system.

We will virally infect the epithelial cells with expression vectors fluorescently-tagged proteins to study focal adhesion formation, cytoskeleton remodeling, and transcription factor translocation. The spectrum of possible fluorescent proteins available (i.e. CFP, GFP, RFP) will allow us to optically monitor multiple biological events simultaneously (Shaner, N. C., Campbell, R. E., Steinbach, P. A., Giepmans, B. N., Palmer, A. E., and Tsien, R. Y. 2004. *Nat Biotechnol* 22:1567-1572). For example, we will investigate changes in gene expression by monitoring CFP-tagged transcription factor translocation into the nucleus and assess the time frame from force to gene expression changes using fluorescent reporters such as TOP-GFP. Importantly, our complementary experiments in 2D culture (Example 6) will allow us to assess how these events may differ in 3D. For example, proteins such as paxillin translocate to the nucleus upon sensing force in 2D culture (Woods, A. J., Roberts, M. S., Choudhary, J., Barry, S. T., Mazaki, Y., Sabe, H., Morley, S. J., Critchley, D. R., and Norman, J. C. 2002. *J Biol Chem* 277:6428-6437); whether this holds true in 3D, and whether the signal transduction kinetics are similar is unknown. In addition, we will investigate cytoskeletal dynamics using GFP- or RFP-Lifeact (Riedl, J., Crevenna, A. H., Kessenbrock, K., Yu, J. H., Neukirchen, D., Bista, M., Bradke, F., Jenne, D., Holak, T. A., Werb, Z., et al. 2008. *Nat Methods* 5:605-607). We have used lentiviruses to express genes and label MECs (Welm, B. E., Dijkgraaf, G. J., Bledau, A. S., Welm, A. L., and Werb, Z. 2008. *Cell Stem Cell* 2:90-102), and are in the process of creating many of these lines. This approach will allow us to simultaneously measure force, cytoskeletal dynamics and transcription factor activity in real-time, and to make a quantitative comparison between 2D and 3D culture conditions.

During branching morphogenesis in the mammary gland, cells of a postnatal epithelial tissue collectively remodel the architecture of a tubular network. This process is hormonally driven, and occurs mostly during puberty, but also during each cycle of pregnancy, lactation, and involution (Hennighausen, L., and Robinson, G. W. 2005. *Nat Rev Mol Cell Biol* 6:715-725). During puberty, the terminal end buds proliferate and migrate through the ECM to establish new ducts. We have used a primary, organotypic 3D culture system to show that normal mammary ducts elongate through the ECM. These pieces of epithelium, termed "organoids," are isolated from the mouse mammary gland, and display stereotypic branching when cultured in 3D laminin-rich matrices like Matrigel supplemented with growth factors (FIG. 12*c*). Remarkably, this process is morphologically similar to mechanisms described for some types of tumor cells to invade and metastasize (Ewald, A. J., Brenot, A., Duong, M., Chan, B. S., and Werb, Z. 2008. *Dev Cell* 14:570-581). However, the cellular forces experienced and exerted by normal versus tumorigenic organoids during this process are not understood. We plan to incorporate tQDs to primary organoids and study the force behavior of the organoids quantitatively in real-time as they branch, while monitoring protein scaffolding at focal adhesions, cytoskeletal dynamics, and gene expression. This will be the first investigation of force behavior during branching morphogenesis in 3D.

We will incorporate the tQDs with primary organoids using two strategies. Mammary epithelia isolated from mice are broken to organoids using previously described methods (Ewald, A. J., Brenot, A., Duong, M., Chan, B. S., and Werb, Z. 2008. *Dev Cell* 14:570-581; Fata, J. E., Mori, H., Ewald, A. J., Zhang, H., Yao, E., Werb, Z., and Bissell, M. J. 2007. *Dev Biol* 306:193-207). These organoids will be cultured overnight on low adhesion plates. During this incubation, tQDs will be added to the media to allow cells on the tQDs to bind to cells on the organoid surface. Alternatively, organoids can be further trypsinized to single cells. These singlets can then be cultured overnight on low adhesion plates with tQDs. This strategy will allow all cells to bind tQDs prior to re-aggregation (as opposed to only cells on the organoid surface). The tQD-labeled cells will be embedded into Matrigel. Primary MECs are capable of branching either with or without trypsinization to singlets. Using a confocal or two-photon microscope (to better penetrate the depth of the ECM), we will image the cells and monitor changes in tQD fluorescence.

We plan to isolate organoids from WT, murine mammary tumor virus (MMTV) polyoma middle T (MMTV-PyMT), MMTV-Wnt and MMTV-Neu mice. The three mouse models of breast cancer are chosen because they represent a spectrum of different human breast cancers: MMTV-PyMT recapitulates many features of a human luminal cancer, MMTV-Wnt recapitulates many features of a human basal cancer, and the MMTV-Neu models a common amplification found in human cases, namely over-expression of the HER2/neu oncogene. The organoids will be cultured in various growth factors to induce branching, i.e. fibroblast growth factor-2 (FGF2) and epidermal growth factor (EGF). The fluorescent behavior of the tQDs will be observed using time-lapse confocal or two-photon microscopy during branching morphogenesis. Our lab has successfully imaged mammary branching in 3D using our home-built spinning disc confocal (Ewald, A. J., Brenot, A., Duong, M., Chan, B. S., and Werb, Z. 2008. *Dev Cell* 14:570-581).

For branching morphogenesis to occur, cells must exert forces through surface receptors such as integrins that are bound to ECM molecules. When integrins are engaged, they cluster and form focal adhesions, which couple the ECM to the cell's cytoskeleton as previously described (Alenghat, F. J., and Ingber, D. E. 2002. *Sci STKE* 2002:pe6; Berrier, A. L., and Yamada, K. M. 2007. *J Cell Physiol* 213:565-573). These signals can regulate differentiation and morphogenesis. Indeed, lack of β1-integrin in mammary cells results in abnormal focal adhesions and disrupts polarity and differentiation (Naylor, M. J., Li, N., Cheung, J., Lowe, E. T., Lambert, E., Marlow, R., Wang, P., Schatzmann, F., Wintermantel, T., Schuetz, G., et al. 2005. *J Cell Biol* 171:717-728). To monitor protein scaffolding events at the focal adhesion, organoids will be transduced with viruses containing GFP-vinculin, GFP-talin, or GFP-focal adhesion kinase (FAK) prior to being embedded, as previously described. This will allow us to simultaneously measure force and monitor protein recruiting at the focal adhesion in 3D. We can image multiple colors by utilizing additional fluorescently-tagged proteins (i.e. CFP, RFP) to monitor cytoskeletal dynamics (GFP- or RFP-Lifeact) as previously described. We have started to cross the Lifeact mice with the MMTV-PyMT, MMTV-Wnt, and MMTV-Neu mice, which will allow simultaneous visualization of actin and tQD fluorescence in real-time.

To investigate changes in gene expression, we will monitor CFP-tagged transcription factor translocation into the nucleus or use transcriptional reporters, as previously described. We have recently undertaken a microarray study of organoids grown in 3D matrices of varying stiffness (unpublished data). Thus, we have a list of candidate genes that are differentially regulated due to matrix stiffness that we can fuse to fluorescent proteins or reporters.

Because we have access to three different mouse tumor models, we will measure and compare force measurements between normal, MMTV-PyMT, MMTV-Wnt and MMTV-Neu organoids during 3D morphogenesis. We expect that as cells grow and branch in 3D, they will transmit forces onto the tQDs via integrins. This will result in a fluorescence change in tQDs (namely, a red-shift as shown in FIG. 10b), which can be used to calculate the corresponding force. We expect that cells expressing oncogenes such as PyMT, Wnt, or Neu will exert different forces than their non-oncogenic controls because many tumors secrete MMPs that actively remodel the ECM, which leads to increased ability to invade and metastasize (Kessenbrock, K., Plaks, V., and Werb, Z. *Cell* 141:52-67; Egeblad, M., and Werb, Z. 2002. *Nat Rev Cancer* 2:161-174). Our lab has additionally models such as C(3)1-Tag and MMTV-PyMT-DB that we can also use.

The tQDs used in these 3D cultures will additional require functionalization with anti-laminin or anti-collagen antibodies in order to anchor tQDs to the matrix. This gives the tQDs ability to bind both integrins on the surface of the cells, as well as the ECM. Although conjugating antibodies to the nanocrystal tQDs has not yet been demonstrated, we believe that that we have the expertise to accomplish this, analogous to what we have previously done for nanocrystal quantum dots currently in use.

We have outlined a strategy to incorporate tQDs with the cell lines and primary organoids prior to embedding into the 3D matrix. However, we can alternatively add the tQDs into the Matrigel or collagen matrix solution (before the matrix stiffens into a semi-solid) so that the cells interact with the tQDs as they branch and invade into the matrix. Because the tQDs will be biofunctionalized with the RGD integrin-binding sequence (as described above), cells will be able to bind to the tQDs through integrin contacts. Excitation at specific x,y,z coordinates using two-photon microscopy will allow us to monitor and measure force changes generated by the cell, both directly and indirectly, as matrix is remodeled.

Our confocal microscope set-up will allow us to correlate intracellular biochemical signaling events, cytoskeletal reorganization, and gene expression to force generation. Previous studies have shown that a protein scaffolding complex and its associated proteins are recruited to integrins upon integrin contact with the ECM. The kinetics of complex assembly with respect to force, however, has never been examined in a 3D system due to the lack of technological tools. Our tQDs can optically report nN changes in force, and are well-suited for this type of study. We will further be able to observe cytoskeletal dynamics using GFP-Lifeact, and gene expression events using fluorescently-tagged transcription factors.

In addition, it is well-recognized that tumor cells can modify the ECM by secreting molecules such as matrix metalloproteinases (MMPs) (Kessenbrock, K., Plaks, V., and Werb, Z. *Cell* 141:52-67). Our lab has developed a full suite of tools to address how MMPs are involved in cell-generated forces, including various MMP knockout mice, vectors to overexpress MMPs, and MMP knockdown constructs. In addition, biosensors to measure MMP activity and other protease activity have been developed by our group and others (Jun, Y. W., Sheikholeslami, S., Hostetter, D. R., Tajon, C., Craik, C. S., and Alivisatos, A. P. 2009. *Proc Natl Acad Sci USA* 106:17735-17740; Olson, E. S., Aguilera, T. A., Jiang, T., Ellies, L. G., Nguyen, Q. T., Wong, E. H., Gross, L. A., and Tsien, R. Y. 2009. *Integr Biol (Camb)* 1:382-393). These tools will allow us to address the question of how MMPs alter cell-generated forces.

Using the 3D organoid system, we will begin to understand the differences in growth behavior at the level of cellular forces. However, we may find that the forces exerted by wild-type and tumorigenic organoids are not different. While this would be a surprising finding given that cancer cells extensively remodel the ECM, this would be have far-reaching implications on how we understand the process of tumorigenesis, invasion and metastasis. Therefore, even if our hypothesis proves to be incorrect, we will have learned about the basic mechanisms cancers use to branch and migrate, which may provide insight into normal developmental mechanisms that may be co-opted during tumor growth, and possibly therapeutic strategies. Furthermore, the fact that we will use organoids from multiple mammary tumor mouse models will allow us to generalize our findings.

Example 8

To localize tQDs to integrin sites, a phytochelatin-related peptide with the KGRGDSP sequence, a motif from fibronectin, is covalently attached at the N-terminal end (FIG. 10d). α5β1 integrins bind with high affinity to the KGRGDSP sequence; α3β1 and αvβ1 also bind to a lesser degree (Hersel, U., Dahmen, C., and Kessler, H. 2003. *Biomaterials* 24:4385-4415). Following ligand exchange, we achieve colloidally stable tQDs functionalized with RGD peptides. Furthermore, we have demonstrated that cardiomyocytes can successfully grow and exhibit beating on two-dimensional substrates covalently linked with a monolayer of functionalized tQDs (FIG. 11a), indicating that these tQDs are indeed biocompatible. The functionalized tQDs will be used in the proposed Aims. As an alternative approach, we can use a recently designed biocompatible ligand that is easily functionalized with peptides and maintains high colloidal stability (Liu, W., Greytak, A. B., Lee, J., Wong, C. R., Park, J., Marshall, L. F., Jiang, W., Curtin, P. N., Ting, A. Y., Nocera, D. G., et al. 2010. *J. Am. Chem. Soc.* 132:472-483).

REFERENCES

1. Alivisatos, A. P. *Science* 1996, 271, 933-37.
2. Peng, X.; Manna, L.; Yang, W.; Wickham, J.; Scher, E.; Kadavanich, A.; Alivisatos, A. P. *Nature* 2000, 404, (6773), 59-61.
3. Manna, L.; Milliron, D. J.; Meisel, A.; Scher, E. C.; Alivisatos, A. P. *Nat. Mater.* 2003, 2, (6), 382-85.
4. Li, J. J.; Wang, Y. A.; Guo, W.; Keay, J. C.; Mishima, T. D.; Johnson, M. B.; Peng, X. *J. Am. Chem. Soc.* 2003, 125, (41), 12567-75.
5. Talapin, D. V.; Nelson, J. H.; Shevchenko, E. V.; Aloni, S.; Sadtler, B.; Alivisatos, A. P. *Nano Lett.* 2007, 7, (10), 2951-59.
6. Carbone, L.; Nobile, C.; De Giorgi, M.; Della Sala, F.; Morello, G.; Pompa, P.; Hytch, M.; Snoeck, E.; Fiore, A.; Franchini, I. R.; Nadasan, M.; Silvestre, A. F.; Chiodo, L.; Kudera, S.; Cingolani, R.; Krahne, R.; Manna, L. *Nano Lett.* 2007, 7, (10), 2942-50.
7. Fiore, A.; Mastria, R.; Lupo, M. G.; Lanzani, G.; Giannini, C.; Carlino, E.; Morello, G.; De Giorgi, M.; Li, Y.; Cingolani, R.; Manna, L. *J. Am. Chem. Soc.* 2009, 131, 2274-82.
8. Alivisatos, P. *Nat. Biotechnol.* 2004, 22, (1), 47-52.
9. Cui, Y.; Bjork, M. T.; Liddle, A.; Sonnichsen, C.; Boussert, B.; Alivisatos, A. P. *Nano Lett.* 2004, 4, (6), 1093-98.
10. Fang, L.; Park, J. Y.; Cut, Y.; Alivisatos, A. P.; Schrier, J.; Lee, B.; Wang, L. W.; Salmeron, M. *J. Chem. Phys.* 2007, 127, 184704.
11. Schrier, J.; Lee, B.; Wang, L. W. *J. Nanosci. Nanotechnol.* 2008, 8, (4), 1994-98.
12. Herbst, C. A.; Cook, R. L.; King, H. E. *J. Non-Cryst. Solids* 1994, 172, 265-71.
13. Mao, H. K.; Bell, P. M.; Shaner, J. W.; Steinbert, D. J. *J. Appl. Phys.* 1978, 49, (6), 3276-83.
14. Venkataprasad Bhat, S. et al. *Chem. Phys. Lett.* 2006, 422, 323-327.
15. Hosemann, R. *Polymer* 1962, 3, 349-392.
16. Schrier, J. et al. *J. Nanosci. Nanotechnol.* 2008, 8, 1994-1998.
17. Choi, C. L., Koski, K. J., Sivasankar, S., and Alivisatos, A. P. 2009. *Nano Lett.* 9:, 3544-3549.
18. Chae, H. G. et al. *J. Appl. Polym. Sci.* 2006, 100, 791-802.
19. Lewin, M. *Handbook of Fiber Chemistry* (2007).
20. Lee, H.-N. et al. *Science* 2009, 323, 231-234.
21. Manna, L., Milliron, D. J., Meisel, A., Scher, E. C., and Alivisatos, A. P. 2003. *Nat. Mater.* 2:382-385.
22. Pinaud, F., King, D., Moore, H.-P., and Weiss, S. 2004. et al. *J. Am. Chem. Soc.* 2004, 126:6115-6123.
23. Hersel, U., Dahmen, C., and Kessler, H. 2003. *Biomaterials* 24:4385-4415.
24. Liu, W., Greytak, A. B., Lee, J., Wong, C. R., Park, J., Marshall, L. F., Jiang, W., Curtin, P. N., Ting, A. Y., Nocera, D. G., et al. 2010. *J. Am. Chem. Soc.* 132:472-483.
25. Dabbousi, B. O., Rodriguez-Viejo, J., Mikulec, F. V., Heine, J. R., Mattoussi, H., Ober, R., Jensen, K. F., and Bawendi, M. G. 1997. *J. Phys. Chem. B.* 101:9463-9475.
26. Son, D. H., Hughes, S. M., Yin, Y., and Alivisatos, A. P. 2004. *Science* 306:1009-1012.
27. Choi, C. L., Koski, K. J., Olson, A. C. K., and Alivisatos, A. P. 2010. A nanocrystal strain gauge for luminescence detection of mechanical forces. *Manuscript submitted*.
28. Dubertret, B., Skourides, P., Norris, D. J., Noireaux, V., Brivanlou, A. H., and Libchaber, A. 2002. *Science* 298: 1759-1762.
29. Pellegrino, T., Manna, L., Kudera, S., Liedl, T., Koktysh, D., Rogach, A. L., Keller, S., Radler, J., Natile, G., and Parak, W. J. 2004. *Nano Lett.* 4:703-707
30. Owen, J. S., Park, J., Trudeau, P.-E., and Alivisatos, A. P. 2008. *J. Am. Chem. Soc.* 130:12279-12281.
31. Provenzano, P. P., Inman, D. R., Eliceiri, K. W., Knittel, J. G., Yan, L., Rueden, C. T., White, J. G., and Keely, P. J. 2008. *BMC Med* 6:11.
32. Erler, J. T., and Weaver, V. M. 2009. Three-dimensional context regulation of metastasis. *Clin Exp Metastasis* 26:35-49.
33. Provenzano, P. P., Eliceiri, K. W., Campbell, J. M., Inman, D. R., White, J. G., and Keely, P. J. 2006. *BMC Med* 4:38.
34. Kessenbrock, K., Plaks, V., and Werb, Z. *Cell* 141:52-67.
35. Levental, K. R., Yu, H., Kass, L., Lakins, J. N., Egeblad, M., Erler, J. T., Fong, S. F., Csiszar, K., Giaccia, A., Weninger, W., et al. 2009. *Cell* 139:891-906.
36. Kubow, K. E., Klotzsch, E., Smith, M. L., Gourdon, D., Little, W. C., and Vogel, V. 2009. *Integr Biol (Camb)* 1:635-648.
37. Kaplan, R. N., Riba, R. D., Zacharoulis, S., Bramley, A. H., Vincent, L., Costa, C., MacDonald, D. D., Jin, D. K., Shido, K., Kerns, S. A., et al. 2005. *Nature* 438:820-827.
38. Lee, P., Lin, R., Moon, J., and Lee, L. P. 2006. *Biomedical Microdevices* 8:35-41.
39. Lorenzo, A. C., and Caffarena, E. R. 2005. *J. Biomechanics* 38:1527-1533.
40. Kulpinski, P. 2005. *Journal of Applied Polymer Science* 98:1793-1798.
41. Chen, X. L., Li, C. Z., Shao, W., Du, H. L., and Burnell-Gray, J. S. 2007. *Journal of Applied Polymer Science* 105: 1490-1495.
42. Stanishevsky, A., Chowdhury, S., Chinoda, P., and Thomas, V. 2008. *J. Biomed. Mater. Res. Part A* 86A:873-882.
43. Alenghat, F. J., and Ingber, D. E. 2002. *Sci STKE* 2002: pe6.
44. Berrier, A. L., and Yamada, K. M. 2007. *J Cell Physiol* 213:565-573.
45. du Roure, O., Saez, A., Buguin, A., Austin, R. H., Chavrier, P., Silberzan, P., and Ladoux, B. 2005. *Proc Natl Acad Sci USA* 102:2390-2395.
46. Pelham, R. J., Jr., and Wang, Y. 1997. *Proc Natl Acad Sci USA* 94:13661-13665.
47. Tan, J. L., Tien, J., Pirone, D. M., Gray, D. S., Bhadriraju, K., and Chen, C. S. 2003. *Proc Natl Acad Sci USA* 100: 1484-1489.
48. Claycomb, W. C., Lanson, N. A., Jr., Stallworth, B. S., Egeland, D. B., Delcarpio, J. B., Bahinski, A., and Izzo, N. J., Jr. 1998. *Proc Natl Acad Sci USA* 95:2979-2984.
49. Riedl, J., Crevenna, A. H., Kessenbrock, K., Yu, J. H., Neukirchen, D., Bista, M., Bradke, F., Jenne, D., Holak, T. A., Werb, Z., et al. 2008. *Nat Methods* 5:605-607.
50. Riedl, J., Flynn, K. C., Raducanu, A., Gartner, F., Beck, G., Bosl, M., Bradke, F., Massberg, S., Aszodi, A., Sixt, M., et al. *Nat Methods* 7:168-169.
51. Liang, C. C., Park, A. Y., and Guan, J. L. 2007. *Nat Protoc* 2:329-333.
52. Friedl, P., and Wolf, K. *J Cell Biol* 188:11-19.
53. Miettinen, P. J., Ebner, R., Lopez, A. R., and Derynck, R. 1994. *J Cell Biol* 127:2021-2036.
54. Hanahan, D., and Weinberg, R. A. 2000. *Cell* 100:57-70.

55. Balaban, N. Q., Schwarz, U. S., Riveline, D., Goichberg, P., Tzur, G., Sabanay, I., Mahalu, D., Safran, S., Bershadsky, A., Addadi, L., et al. 2001. *Nat Cell Biol* 3:466-472.
56. Woods, A. J., Roberts, M. S., Choudhary, J., Barry, S. T., Mazaki, Y., Sabe, H., Morley, S. J., Critchley, D. R., and Norman, J. C. 2002. *J Biol Chem* 277:6428-6437.
57. Vermeulen, L., De Sousa, E. M. F., van der Heijden, M., Cameron, K., de Jong, J. H., Borovski, T., Tuynman, J. B., Todaro, M., Merz, C., Rodermond, H., et al. *Nat Cell Biol* 12:468-476.
58. Lee, G. Y., Kenny, P. A., Lee, E. H., and Bissell, M. J. 2007. *Nat Methods* 4:359-365.
59. Debnath, J., and Brugge, J. S. 2005. *Nat Rev Cancer* 5:675-688.
60. Zhan, L., Rosenberg, A., Bergami, K. C., Yu, M., Xuan, Z., Jaffe, A. B., Allred, C., and Muthuswamy, S. K. 2008. *Cell* 135:865-878.
61. Weaver, V. M., Lelievre, S., Lakins, J. N., Chrenek, M. A., Jones, J. C., Giancotti, F., Werb, Z., and Bissell, M. J. 2002. *Cancer Cell* 2:205-216.
62. Shaner, N. C., Campbell, R. E., Steinbach, P. A., Giepmans, B. N., Palmer, A. E., and Tsien, R. Y. 2004. *Nat Biotechnol* 22:1567-1572
63. Welm, B. E., Dijkgraaf, G. J., Bledau, A. S., Welm, A. L., and Werb, Z. 2008. *Cell Stem Cell* 2:90-102.
64. Hennighausen, L., and Robinson, G. W. 2005. *Nat Rev Mol Cell Biol* 6:715-725.
65. Ewald, A. J., Brenot, A., Duong, M., Chan, B. S., and Werb, Z. 2008. *Dev Cell* 14:570-581.
66. Fata, J. E., Mori, H., Ewald, A. J., Zhang, H., Yao, E., Werb, Z., and Bissell, M. J. 2007. *Dev Biol* 306:193-207.
67. Naylor, M. J., Li, N., Cheung, J., Lowe, E. T., Lambert, E., Marlow, R., Wang, P., Schatzmann, F., Wintermantel, T., Schuetz, G., et al. 2005. *J Cell Biol* 171:717-728.
68. Egeblad, M., and Werb, Z. 2002. *Nat Rev Cancer* 2:161-174.
69. Jun, Y. W., Sheikholeslami, S., Hostetter, D. R., Tajon, C., Craik, C. S., and Alivisatos, A. P. 2009. *Proc Natl Acad Sci USA* 106:17735-17740.
70. Olson, E. S., Aguilera, T. A., Jiang, T., Ellies, L. G., Nguyen, Q. T., Wong, E. H., Gross, L. A., and Tsien, R. Y. 2009. *Integr Biol (Camb)* 1:382-393.

It is noted that as used herein and in the appended claims, the singular forms "a", "and", and "the" include plural referents unless the context clearly dictates otherwise.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of detecting force comprising:
exposing a tetrapod nanocrystal to light which produces a luminescent response by the tetrapod nanocrystals, the tetrapod nanocrystals coupling a first medium to a second medium; and
detecting a difference between the luminescent response by the tetrapod nanocrystal and a base luminescent response and converting the difference to a force measurement that indicates a force between the first and second mediums.

2. The method of claim 1 wherein the tetrapod nanocrystal comprising CdSe.

3. The method of claim 1 wherein the tetrapod nanocrystal comprising CdS.

4. The method of claim 1 wherein the tetrapod nanocrystal comprising a CdSe core and CdS arms.

5. The method of claim 1 wherein the first and second mediums comprising biological material.

6. The method of claim 5 wherein the first and second mediums comprising cells and the change in the luminescent response by the tetrapod nanocrystal indicates forces between the cells.

7. The method of claim 5 wherein the first medium comprises a cell and the second medium comprises an extracellular matrix, and the change in the luminescent response by the tetrapod nanocrystal indicates forces between the cell and the extracellular matrix.

8. The method of claim 1 wherein the first medium comprises biological tissue and the second medium comprises a solid material.

9. The method of claim 8 wherein the difference in the luminescent response indicates the force exerted by the biological tissue on the solid material.

10. The method of claim 1 wherein the first medium comprises a solid material and the second material comprise a flexible material, and the difference in the luminescent response by the single or a plurality of tetrapod nanocrystals indicates forces between the solid material and the flexible material.

11. The method of claim 1 wherein the first medium comprising a natural polymer, a synthetic polymer, a polymer fiber, or polymer glass.

12. The method of claim 1 wherein the luminescent response comprises fluorescence.

13. The method of claim 1 wherein the luminescent response comprises a photoluminescent spectrum.

14. The method of claim 13 wherein the difference in the luminescent response comprises a shift of a maximum intensity wavelength of the photoluminescent spectrum.

15. The method of claim 14 wherein the shift of the maximum intensity wavelength of the photoluminescent spectrum varies among the single or a plurality of tetrapod nanocrystals which indicates forces between the first and second mediums.

16. The method of claim 13 wherein the difference in the luminescent response comprises a broadening of the photoluminescent spectrum.

17. The method of claim 16 wherein the broadening of the photoluminescent spectrum varies among the tetrapod nanocrystals which indicates a range of force between the first and second mediums.

18. A method of detecting stress or strain comprising:
exposing a sample that comprises a medium and a tetrapod nanocrystal embedded in the medium to light which produces a luminescent response by the tetrapod nanocrystal; and
detecting a difference between the luminescent response by the tetrapod nanocrystal and a base luminescent response and converting the difference to a force measurement that indicates stress within the sample or strain of the sample.

19. The method of claim 18 wherein the stress is an anisotropic stress.

20. The method of claim 18 wherein the tetrapod nanocrystal comprising CdSe.

21. The method of claim 18 wherein the tetrapod nanocrystal comprising CdS.

22. The method of claim 18 wherein the tetrapod nanocrystal comprising a CdSe core and CdS arms.

23. The method of claim 18 wherein the luminescent response comprises a photoluminescent spectrum.

24. The method of claim 23 wherein the difference in the luminescent response comprises a shift of a maximum intensity wavelength of the photoluminescent spectrum.

25. The method of claim 24 wherein a value of the shift of the maximum intensity wavelength indicates stress at the tetrapod nanocrystal.

26. The method of claim 23 wherein the difference in the luminescent response comprises a broadening of the photoluminescent spectrum.

27. The method of claim 23 wherein the shift of the maximum intensity wavelength of the photoluminescent spectrum varies among the tetrapod nanocrystals which indicates a range of the stress or strain within the sample.

28. The method of claim 18 wherein the luminescent response comprises fluorescence.

29. The method of claim 18 wherein the medium comprises a solid material.

30. The method of claim 18 wherein the medium comprises a nanostructure.

31. The method of claim 18 wherein the medium comprises a polymer fiber.

32. The method of claim 31 wherein the polymer fiber is a natural, synthetic, or biological polymer.

33. The method of claim 18 wherein the medium comprises a polymer glass.

34. The method of claim 18 further comprising a plurality of tetrapod nanocrystals.

35. The method of claim 18 wherein the tetrapod nanocrystals have arm lengths between 24.3 nm and 31.3 nm.

36. The method of claim 18 wherein the tetrapod nanocrystals have arm lengths greater than 31.3 nm.

37. The method of claim 18 wherein the tetrapod nanocrystals have arm lengths less than 24.3 nm.

* * * * *